(12) United States Patent
Luo et al.

(10) Patent No.: US 11,849,430 B2
(45) Date of Patent: Dec. 19, 2023

(54) UPLINK RESOURCE ALLOCATION AND ACTIVATION

(71) Applicant: QUALCOMM Incorporated, San Diego, CA (US)

(72) Inventors: Jianghong Luo, Skillman, NJ (US); Junyi Li, Chester, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/010,649

(22) Filed: Sep. 2, 2020

(65) Prior Publication Data

US 2021/0076358 A1    Mar. 11, 2021

Related U.S. Application Data

(60) Provisional application No. 62/897,704, filed on Sep. 9, 2019.

(51) Int. Cl.
*H04W 72/04* (2023.01)
(52) U.S. Cl.
CPC .................................. *H04W 72/04* (2013.01)
(58) Field of Classification Search
CPC . H04W 72/04; H04W 36/0009; H04W 24/04; H04W 36/0072; H04W 36/38; H04W 74/08; H04W 76/18; H04W 76/27; H04W 76/28; H04W 84/04; H04W 36/305
See application file for complete search history.

(56) References Cited

U.S. PATENT DOCUMENTS

| 8,767,654 B2 | 7/2014 | Terry et al. |
| 9,554,373 B2 | 1/2017 | Shi et al. |
| 9,661,478 B2 | 5/2017 | Xiong |
| (Continued) | | |

FOREIGN PATENT DOCUMENTS

| CN | 106941725 A | 7/2017 |
| WO | 2019160969 A1 | 8/2019 |

OTHER PUBLICATIONS

U.S. Appl. No. 62/754,560 (Year: 2018).*
(Continued)

*Primary Examiner* — Rushil P. Sampat
(74) *Attorney, Agent, or Firm* — Patterson + Sheridan, L.L.P.

(57) ABSTRACT

The present disclosure provides techniques for uplink resource management. For example, a method of wireless communication by a first communication device is provided including receiving, from a second communication device, a configuration allocating at least one uplink resource for use by the first communication device to transmit data on an uplink. The method further includes initiating preparing data for transmission on a first uplink resource of the at least one uplink resource prior to receiving an activation indication for the first uplink resource. The method further includes when the activation indication is received from the second communication device, transmitting uplink data on the first uplink resource to the second communication device. The method further includes when failing to receive the activation indication from the second communication device, refraining from transmitting uplink data on the first uplink resource.

24 Claims, 14 Drawing Sheets

(56) References Cited

U.S. PATENT DOCUMENTS

| | | | |
|---|---|---|---|
| 10,206,232 B2 | 2/2019 | Novlan et al. | |
| 2010/0150089 A1 | 6/2010 | Yu et al. | |
| 2017/0230997 A1 | 8/2017 | Damnjanovic et al. | |
| 2018/0167916 A1* | 6/2018 | Zhang | H04W 72/042 |
| 2019/0190681 A1 | 6/2019 | Li et al. | |
| 2020/0145967 A1* | 5/2020 | Park | H04W 72/0426 |
| 2020/0146109 A1* | 5/2020 | Majmundar | H04W 92/14 |
| 2020/0252847 A1 | 8/2020 | Park et al. | |
| 2020/0275431 A1* | 8/2020 | Bae | H04L 5/0094 |
| 2021/0029719 A1 | 1/2021 | Zhou et al. | |
| 2021/0076453 A1 | 3/2021 | Luo et al. | |
| 2021/0250941 A1 | 8/2021 | Tiirola et al. | |
| 2021/0259012 A1 | 8/2021 | Huang et al. | |
| 2021/0315053 A1 | 10/2021 | Kim et al. | |
| 2021/0321315 A1* | 10/2021 | Yi | H04W 76/27 |
| 2021/0368481 A1* | 11/2021 | Jo | H04W 28/16 |

OTHER PUBLICATIONS

WO 2020/032528 A1 (Year: 2019).*
3GPP TS 38.321: "3rd Generation Partnership Project; Technical Specification Group Radio Access Network, NR; Medium Access Control (MAC) Protocol Specification (Release 15)", 3GPP TS 38.321 V15.6.0 (Jun. 2019), pp. 1-77.
Ericsson, "IAB Resource Configuration and Multiplexing", 3GPP TSG-RAN WG1 Meeting #97, R1-1906588, Reno, U.S., May 13-17, 2019, (Year: 2019), 9 Pages.
Nokia, et al., "Mechanisms for Resource Multiplexing Among Backhaul and Access Links", 3GPP draft, 3GPP TSG RAN WG1 Meeting #98, R1-1908987 IAB Resource Allocation, 3rd Generation Partnership Project (3GPP), Mobile Competence Centre, 650, Route Des Lucioles, F-06921, Sophia-Antipolis Cedex, France, vol. RAN WG1. No. Prague. Czech Republic, Aug. 26, 2019-Aug. 30, 2019, Aug. 16, 2019 (Aug. 16, 2019), XP051765591, 20 pages, http://www.3gpp.org/ftp/tsg_ran/WG1_RL1/TSGR1_98/Docs/R1-1908987.zip [retrieved on Aug. 16, 2019] Proposal 2.
Vivo: "UL Inter-UE Tx Prioritization for URLLC", 3GPP Draft, 3GPP TSG RAN WG1 #97, R1-1906150_UL Inter UE TX Prioritization for URLLC, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 1, 2019 (May 1, 2019), XP051708191, 13 Pages URL: http://www.3gpp.org/ftp/tsg%5Fran/WG1%5FRL1/TSGR1%5F97/Docs/R1%2D1906150%2Ezip [retrieved on May 1, 2019], pp. 1-9, the whole document.
Ericsson: "IAB Resource Configuration and Assignment", 3GPP Draft, 3GPP TSG-RAN WG1 Meeting #96, R1-1903226, 3rd Generation Partnership Project (3GPP), Mobile Competence Centre, 650, Route Des Lucioles, F-06921 Sophia-Antipolis Cedex, France, vol. RAN WG1, No. Athens, Greece, Mar. 25, 2019-Mar. 1, 2019, Feb. 18, 2019 (Feb. 18, 2019), XP051600921, 6 Pages, Section 1, Section 2.1, Section 2.2.1-Section 2.2.2.
International Search Report and Written Opinion—PCT/US2020/049238—ISA/EPO—dated Nov. 2, 2020.

* cited by examiner

UPLINK RESOURCE ALLOCATION AND ACTIVATION

CROSS-REFERENCE TO RELATED APPLICATION(S)

This application claims benefit of and priority to U.S. Provisional Application No. 62/897,704, filed Sep. 9, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for managing uplink resources in a wireless communication system.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between communication devices.

Certain aspects provide a method for wireless communication by a first communication device. The method generally includes receiving, from a second communication device, a configuration allocating at least one uplink resource for use by the first communication device to transmit data on an uplink. The method further includes initiating preparing data for transmission on a first uplink resource of the at least one uplink resource prior to receiving an activation indication for the first uplink resource. The method further includes when the activation indication is received from the second communication device, transmitting uplink data on the first uplink resource to the second communication device. The method further includes when failing to receive the activation indication from the second communication device, refraining from transmitting uplink data on the first uplink resource.

Certain aspects provide a method for wireless communication by a first communication device. The method generally includes transmitting, to a second communication device, a configuration allocating at least one uplink resource for use by the second communication device to transmit data on an uplink. The method further includes one of: transmitting an activation indication for a first uplink resource of the at least one uplink resource to the second communication device, and receiving uplink data on the first uplink resource from the second communication device; or refraining from transmitting the activation indication.

Certain aspects provide a first communication device. The first communication device includes a memory and a processor coupled to the memory. The memory and the processor are configured to receive a configuration allocating at least one uplink resource for use by the first communication device to transmit data on an uplink. The memory and the processor are configured to initiate preparing data for transmission on a first uplink resource of the at least one uplink resource prior to receiving an activation indication for the first uplink resource. The memory and the processor are configured to when the activation indication is received, transmit uplink data on the first uplink resource to a second communication device. The memory and the processor are configured to when failing to receive the activation indication, refrain from transmitting uplink data on the first uplink resource.

Certain aspects provide a first communication device. The first communication device includes a memory and a processor coupled to the memory. The memory and the processor are configured to transmit, to a second communication device, a configuration allocating at least one uplink resource for use by the second communication device to transmit data on an uplink. The memory and the processor are configured to at least one of: transmit an activation indication for a first uplink resource of the at least one uplink resource to the second communication device, and receive uplink data on the first uplink resource from the second communication device; or refrain from transmitting the activation indication.

Certain aspects provide a first communication device. The first communication device generally includes means for receiving, from a second communication device, a configuration allocating at least one uplink resource for use by the first communication device to transmit data on an uplink. The first communication device further includes means for initiating preparing data for transmission on a first uplink resource of the at least one uplink resource prior to receiving an activation indication for the first uplink resource. The first communication device further includes means for when the activation indication is received from the second communication device, transmitting uplink data on the first uplink resource to the second communication device. The first communication device further includes means for when failing to receive the activation indication from the second communication device, refraining from transmitting uplink data on the first uplink resource.

Certain aspects provide a first communication device. The first communication device generally includes means for transmitting, to a second communication device, a configuration allocating at least one uplink resource for use by the second communication device to transmit data on an uplink. The first communication device further includes at least one of: means for transmitting an activation indication for a first uplink resource of the at least one uplink resource to the second communication device, and means for receiving uplink data on the first uplink resource from the second communication device; or means for refraining from transmitting the activation indication.

Certain aspects provide a non-transitory computer-readable storage medium having instructions stored thereon for performing a method for wireless communication by a first communication device. The method generally includes receiving, from a second communication device, a configuration allocating at least one uplink resource for use by the first communication device to transmit data on an uplink. The method further includes initiating preparing data for transmission on a first uplink resource of the at least one uplink resource prior to receiving an activation indication for the first uplink resource. The method further includes when the activation indication is received from the second communication device, transmitting uplink data on the first uplink resource to the second communication device. The method further includes when failing to receive the activation indication from the second communication device, refraining from transmitting uplink data on the first uplink resource.

Certain aspects provide a non-transitory computer-readable storage medium having instructions stored thereon for performing a method for wireless communication by a first communication device. The method generally includes transmitting, to a second communication device, a configuration allocating at least one uplink resource for use by the second communication device to transmit data on an uplink. The method further includes one of: transmitting an activation indication for a first uplink resource of the at least one uplink resource to the second communication device, and receiving uplink data on the first uplink resource from the second communication device; or refraining from transmitting the activation indication.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
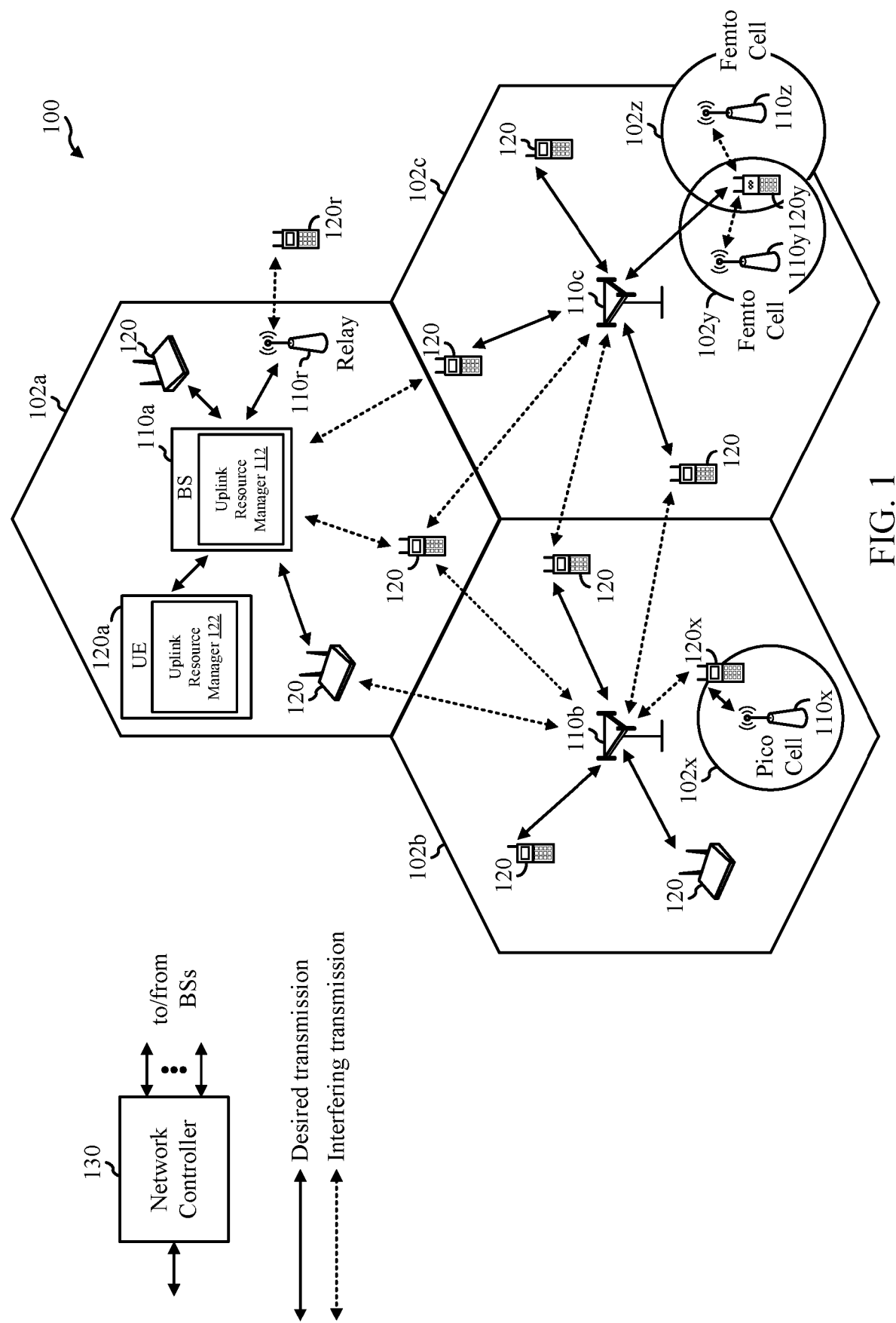
FIG. 1 is a block diagram conceptually illustrating an example telecommunications system, in accordance with certain aspects of the present disclosure.

Aspects of the present disclosure provide apparatus, methods, processing systems, and computer readable mediums for supporting uplink resource pre-allocated grant and activation indication in a wireless communication system.

Though certain aspects are described herein with respect to "wireless communication devices" it should be understood that such "wireless communication devices" may additionally be able to communicate via wired communication, and may be referred to simply as communication devices. Further, aspects herein referring to wireless communication devices may also be used for other suitable communication devices.

Certain aspects herein relate to a first device (e.g., a BS) pre-allocating the use of communication resources (e.g., time, frequency, spatial layers, etc.) to a second device (e.g., UE). However, pre-allocation of the communication resources to the second device does not guarantee that the communication resources will be available for use by the second device to transmit data. Rather, the second device waits for an activation indication from the first device indicating that the pre-allocated communication resources can actually be used by the second device. If the second device does not receive such an activation indication, it does not transmit on the communication resources. If the second device does receive such an activation indication, it can transmit on the communication resources. Advantageously, the second device can begin preparing data for transmission on the communication resources after receiving the pre-allocation but prior to receiving the activation indication, instead of having to wait until the activation indication is received to prepare data (such waiting may not leave enough time to transmit in the communication resources).

For example, in certain aspects, a first (e.g., wireless) communication device (e.g., a UE or child IAB-node) is configured to transmit uplink data on an uplink to a second (e.g., wireless) communication device (e.g., a BS or parent IAB-node). For example, the first wireless communication device is granted one or more time resources such as symbols, slots, subframes, etc., such as by the second wireless communication device, to communicate on the uplink with the second wireless communication device. The one or more time resources correspond to one or more uplink resources used by the UE to transmit uplink data. The one or more uplink resources may also include one or more frequency resources, spatial resources, etc. during the one or more time resources. The first wireless communication device can then transmit uplink data to the second wireless communication device on the granted one or more uplink resources.

In certain aspects, the second wireless communication device grants the first wireless communication device uplink resources using a dynamic downlink control information (DCI) grant. For example, the second wireless communication device transmits a dynamic grant in DCI over a physical downlink control channel (PDCCH) to the first wireless communication device. The downlink DCI grant indicates one or more uplink resources (e.g., individually/separately indicates each of the one or more uplink resources) that are granted to the first wireless communication device for communication on the uplink with the second wireless communication device.

In certain aspects, the second wireless communication device grants the first wireless communication device uplink resources using a first type of configured grant (e.g., referred to as Type1). For example, the second wireless communication device transmits a radio resource control (RRC) message to the first wireless communication device. The RRC message indicates a periodicity (e.g., in terms of subframe, slot, symbol, other time period, etc.) and an offset (e.g., from a starting/first indexed subframe, slot, symbol, etc.). Accordingly, the RRC message grants periodic uplink resources to the first wireless communication device for communication on the uplink with the second wireless communication device according to the indicated periodicity and offset.

In certain aspects, the second wireless communication device grants the first wireless communication device uplink resources using a second type of configured grant (e.g., referred to as Type2). For example, the second wireless communication device transmits both a RRC message and DCI grant to the first wireless communication device to grant uplink resources to the first wireless communication device for communication on the uplink with the second wireless communication device. The RRC message may indicate basic configuration information for uplink resources, such as a periodicity, configuration for a demodulation reference symbol (DMRS), etc. The DCI grant is then be used to activate or deactivate grant of the uplink resources configured by the RRC message. For example, after the RRC message is sent to the first wireless communication device, a DCI grant may be sent to the first wireless communication device to activate the grant of the uplink resources, meaning the first wireless communication device can use the uplink resources to communicate. Further, at another time, a DCI grant may be sent to the first wireless communication device to deactivate the grant of the uplink resources, meaning the wireless communication device can no longer use the uplink resources to communicate. In certain aspects, the DCI grant indicates time and/or frequency resource allocation for the uplink resources, modulation coding scheme (MCS), one or more antenna ports, transmission configuration indication (TCI), etc. Accordingly, in the second type of configured grant, the uplink resources are considered semi persistent (SPS) resources as the grant can be activated or deactivated.

In certain aspects, the transmission of dynamic DCI grant and/or DCI grant activation/deactivation (e.g., for Type2) to the first wireless communication device from the second wireless communication device is triggered based on a buffer status report (BSR) received by the second wireless communication device from the first wireless communication device. For example, the first wireless communication device includes an uplink buffer, which is configured to store uplink data that the first wireless communication device has for transmission. The BSR indicates a status of the uplink buffer, and accordingly indicates whether the first wireless communication device has uplink data (e.g., and how much it has) to transmit to the second wireless communication device. If the BSR indicates that the first wireless communication device has uplink data to transmit, the second wireless communication device may accordingly transmit a dynamic DCI grant or DCI grant activation granting uplink resources to the first wireless communication device. If the BSR indicates that the first wireless communication device does not have uplink data to transmit, the second wireless communication device may accordingly not transmit a dynamic DCI grant or transmit a DCI grant deactivation.

In certain aspects, the first wireless communication device needs to be granted one or more uplink resources to transmit the BSR to the second wireless communication device. Accordingly, the first wireless communication device is configured to transmit a scheduling request (SR) to the second wireless communication device. The SR requests one or more uplink resources from the second wireless communication device for reporting BSR from the first wireless communication device to the second wireless communication device and/or for transmitting short (e.g., small in size) data packets including uplink data from the first wireless communication device to the second wireless communication device.

In certain aspects, the first wireless communication device is configured to transmit SR to the second wireless communication device if one or more triggering conditions are met (e.g., as defined in 3GPP TS 38.321 incorporated herein by reference). One example triggering condition includes if the first wireless communication device does not have any available or granted uplink resources for transmitting a regular BSR to the second wireless communication device.

Another example triggering condition includes if the first wireless communication device has a configured grant (e.g., Type1 or Type2 activated) of uplink resources and a SR mask is set to false for the logical channel that triggers the regular BSR. For example, a flag set to either true or false for SR mask for a given logical channel (e.g., uplink channel between the first wireless communication device and the second wireless communication device) is configured using RRC messaging (e.g., transmitted from the second wireless communication device to the first wireless communication device) for the first wireless communication device. If SR mask is set to false, then the first wireless communication device is configured to transmit SR even if it has a configured grant. If the SR mask is set to true, then the first wireless communication device is configured to not transmit SR and just use the uplink resources indicated by the configured grant to transmit BSR.

For configured grants (e.g., Type1 or Type2), where the first wireless communication device is granted periodic uplink resources, depending on the traffic pattern, the first wireless communication device may not always have uplink data to transmit on all of the granted periodic uplink resources.

In certain aspects, the first wireless communication device can use SR to notify the second wireless communication device whether it is going to use an upcoming granted uplink resource. For example, if the first wireless communication device has an uplink packet in its uplink buffer, and the uplink packet is received (e.g., from an application, processor, etc. in the first wireless communication device) in the uplink buffer at least a threshold time prior to occurrence in time of a given granted uplink resource, then the first wireless communication device can transmit the uplink packet in the given granted uplink resource. Accordingly, if the described condition regarding the uplink packet in the uplink buffer is met, the first wireless communication device determines it is going to use the upcoming given granted uplink resource and transmits the SR to the second wireless communication device to notify the second wireless communication device that it is going to use the upcoming given granted uplink resource. The SR may be configured to be transmitted on an uplink resource that occurs the threshold time prior to occurrence in time of the given granted uplink resource. If the described condition is not met, the first wireless communication device determines it is not going to use the upcoming given granted uplink resource and does not transmit the SR to the second wireless communication device. By not receiving the SR, the second wireless communication device determines that the first wireless communication device is not going to use the upcoming given granted uplink resource. In certain aspects, the threshold time prior to occurrence in time of the given granted uplink resource is a packet preparation time (e.g., physical uplink shared channel (PUSCH) preparation time) required for the first wireless communication device to prepare the uplink packet for transmission to the second wireless communication device.

In certain aspects, when the first wireless communication device notifies the second wireless communication device that it is not going to use a granted given uplink resource (e.g., the first wireless communication device notifies to release grant of the given uplink resource), the second wireless communication device can repurpose the given uplink resource. For example, the second wireless communication device can grant the given uplink resource to a third wireless communication device (e.g., a UE or child IAB-node) for the third wireless communication device to use to transmit uplink data to the second wireless communication device. In another example, the second wireless communication device can itself use the given uplink resource to transmit uplink data to a third wireless communication device (e.g., a parent IAB-node).

In certain aspects, where the first wireless communication device frequently releases grant of uplink resources, using SR to indicate to the second wireless communication device only the occasional uplink resources that the first wireless communication device does use provides efficient use of communication resources. In particular, when configured to use SR, the first wireless communication device does not need to transmit any signaling for granted uplink resources it releases as discussed. Rather, SR may only be transmitted for the occasional uplink resources that the first wireless communication device does use.

In certain aspects, however, the first wireless communication device may frequently use granted uplink resources and only occasionally release grant of uplink resources.

Accordingly, certain aspects herein provide an uplink resource grant release message, also referred to as a negative SR. The uplink resource grant release message indicates that a granted uplink resource should be released (e.g., will not be used). For example, the first wireless communication device may transmit the uplink resource grant release message for a given granted uplink resource to the second wireless communication device. Based on receiving the uplink resource grant release message, the second wireless communication device determines that the given uplink resource can be repurposed (e.g., it will not be used by the first wireless communication device). If the second wireless communication device does not receive an uplink resource grant release message for a given granted uplink resource, the second wireless communication device determines that the first wireless communication device will use the given uplink resource.

Accordingly, where the first wireless communication device frequently uses granted uplink resources and only occasionally releases grant of uplink resources, using the uplink resource grant release message to indicate to the second wireless communication device only the occasional uplink resources that the first wireless communication device releases provides efficient use of communication resources. In particular, in certain aspects, when configured to use uplink resource grant release message, the first wireless communication device may not need to transmit any signaling for granted uplink resources it uses as discussed. Rather, in certain aspects, uplink resource grant release message may only be transmitted for the occasional uplink resources that the first wireless communication device releases.

In certain aspects, such as where the first wireless communication device frequently uses granted uplink resources and only occasionally releases grant of uplink resources, techniques are provided herein to pre-allocate uplink resources that are the same as or overlap with those granted to the first wireless communication device to a third wireless communication device (e.g., UE or IAB-node (e.g., MT)). For example, the second wireless communication device may pre-allocate uplink resources to the third wireless communication device using a message similar to a configured grant, the message being referred to herein to as a pre-allocated grant. In particular, the pre-allocated grant may include the same or similar information as a configured grant (e.g., Type1 or Type2), but uplink resources are only allocated by the pre-allocated grant and not actually granted for use by the third wireless communication device until activated. In particular, each uplink resource allocated to the third wireless communication device is not activated or actually granted to the third wireless communication device unless the third wireless communication device receives an activation indication corresponding to the uplink resource from the second wireless communication device. Advantageously, such techniques allow for efficient repurposing of uplink resources released by the first wireless communication device. Further, this allows the third wireless communication device to prepare uplink data for transmission in advance of receiving notification that a given uplink resource is activated. Further, this advantageously reduces signaling to the third wireless communication device to grant uplink resources as the activation indication is only occasionally sent for the occasional release of grant of uplink resources by the first wireless communication device.

It should be noted that the pre-allocated grant and activation indication differ from the discussed RRC message and DCI grant (e.g., respectively) of Type2 configured grant in several aspects. For example, a DCI grant of a Type2 configured grant, as discussed, includes scheduling grant information like MCS, time/frequency allocation, etc., while in certain aspects, an activation indication does not include such scheduling grant information, and instead only indicates activation of the grant configured in the pre-allocated grant. For example, in certain aspects, the activation indication is only 1-bit of information that activates the pre-allocated grant. The pre-allocated grant includes the full scheduling information.

Further, as discussed, a wireless communication device can prepare uplink data for transmission for uplink resources allocated by pre-allocated grant prior to receiving the activation indication. However, since DCI grant of a Type2 configured grant includes the scheduling grant information, a wireless communication device cannot prepare uplink data for transmission based on the RRC message of Type2 configured grant alone, and instead needs to wait for the DCI grant as well.

Further, the time between when a first wireless communication device releases an uplink resource and the time that the uplink resource occurs may be short. For example, if the time between is less than a packet preparation time, then the second wireless communication device may not be able to reallocate the uplink resource to the third wireless communication device using Type2 configured grant in time for the uplink resource to be used by the third wireless communication device as the third wireless communication device cannot prepare the uplink data for transmission earlier. As discussed, the techniques for pre-allocated grant and activation indication solve such issues.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for using pre-allocated grant and activation indication as discussed herein. As shown in FIG. 1, the BS 110a includes an uplink resource manager 112. The uplink resource manager 112 may be configured to manage uplink resources using pre-allocated grant and activation indication, in accordance with aspects of the present disclosure. As shown in FIG. 1, the UE 120a includes an uplink resource manager 122. The uplink resource manager 122 may be configured to manage uplink resources using pre-allocated grant and activation indication, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
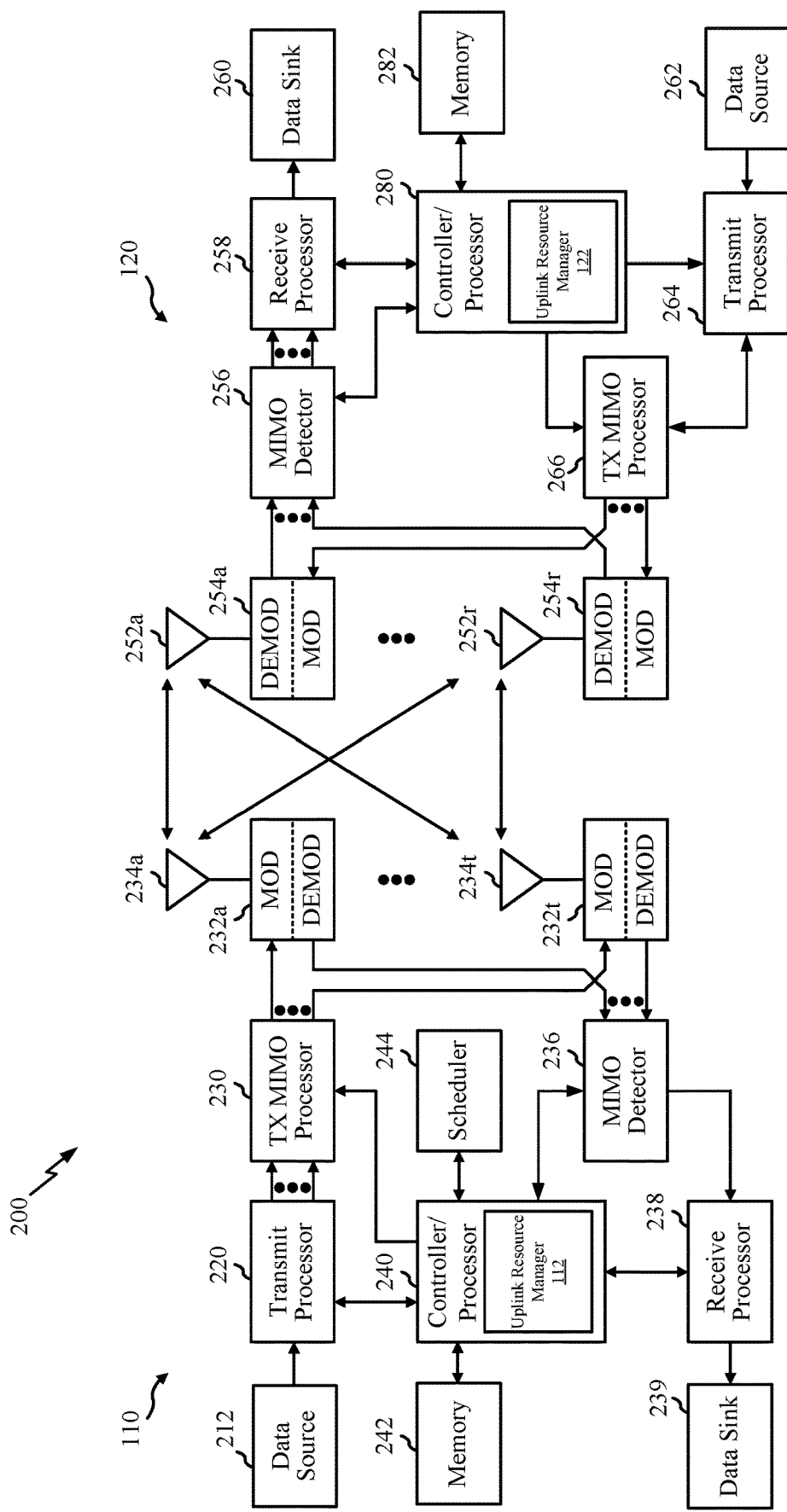
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has an uplink resource manager 112 configured to manage uplink resources using pre-allocated grant and activation indication, in accordance with aspects of the present disclosure. For example, as shown in FIG. 2, the controller/processor 280 of the UE 120 has an uplink resource manager 122 configured to manage uplink resources using pre-allocated grant and activation indication, in accordance with aspects of the present disclosure.

It should be noted that though FIG. 2 illustrates UE 120 communicating with a BS 110, a child IAB-node may similarly communicate with a parent IAB-node and each may (e.g., respectively) have similar components as discussed with respect to FIG. 2.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
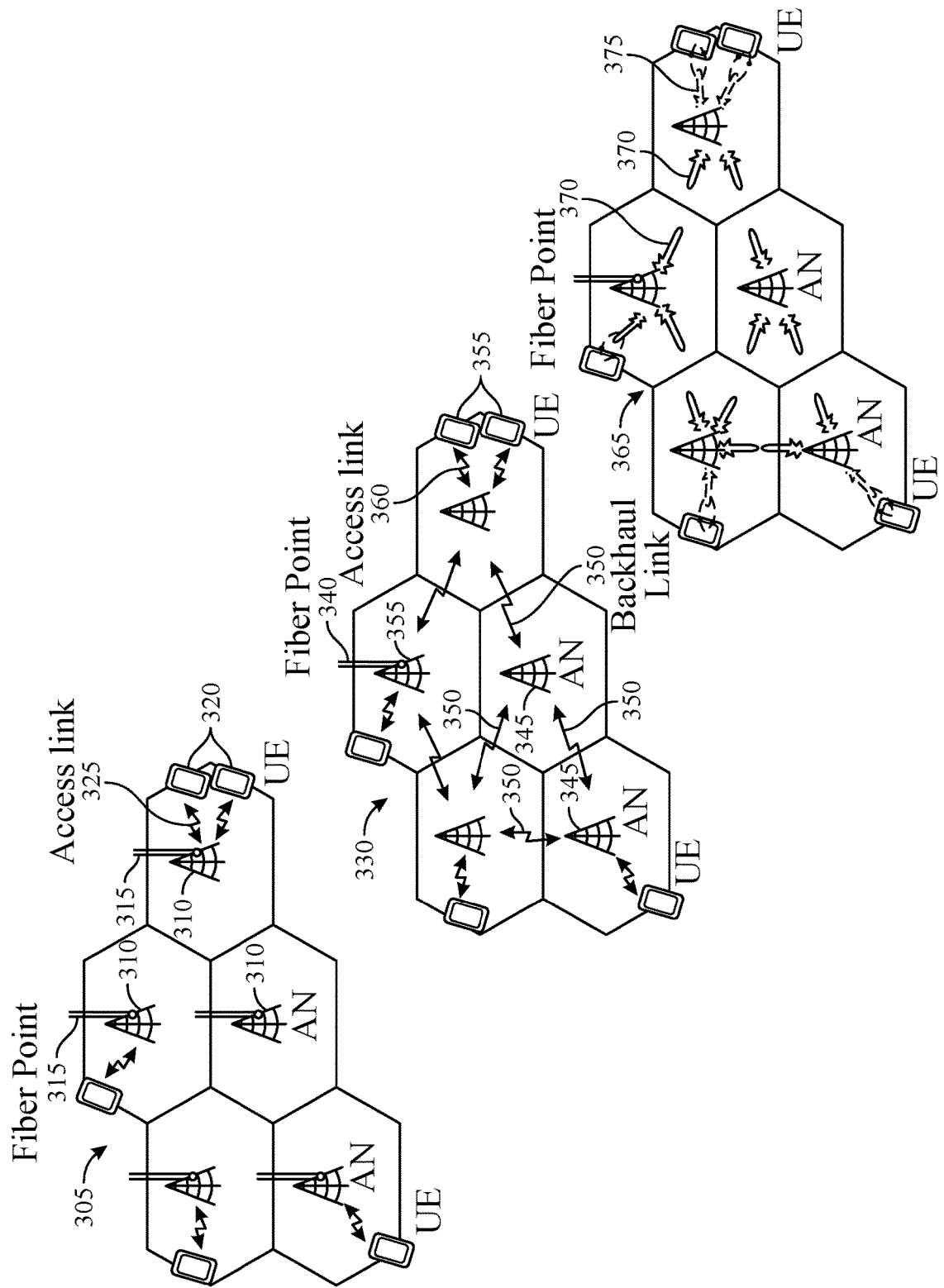
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIGS. 1 and/or 2. Similarly, a UE 320 shown in FIG. 3 may correspond to a UE 120 shown in FIGS. 1 and/or 2.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIGS. 1 and/or 2. Similarly, a UE 355 shown in FIG. 3 may correspond to a UE 120 shown in FIGS. 1 and/or 2.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
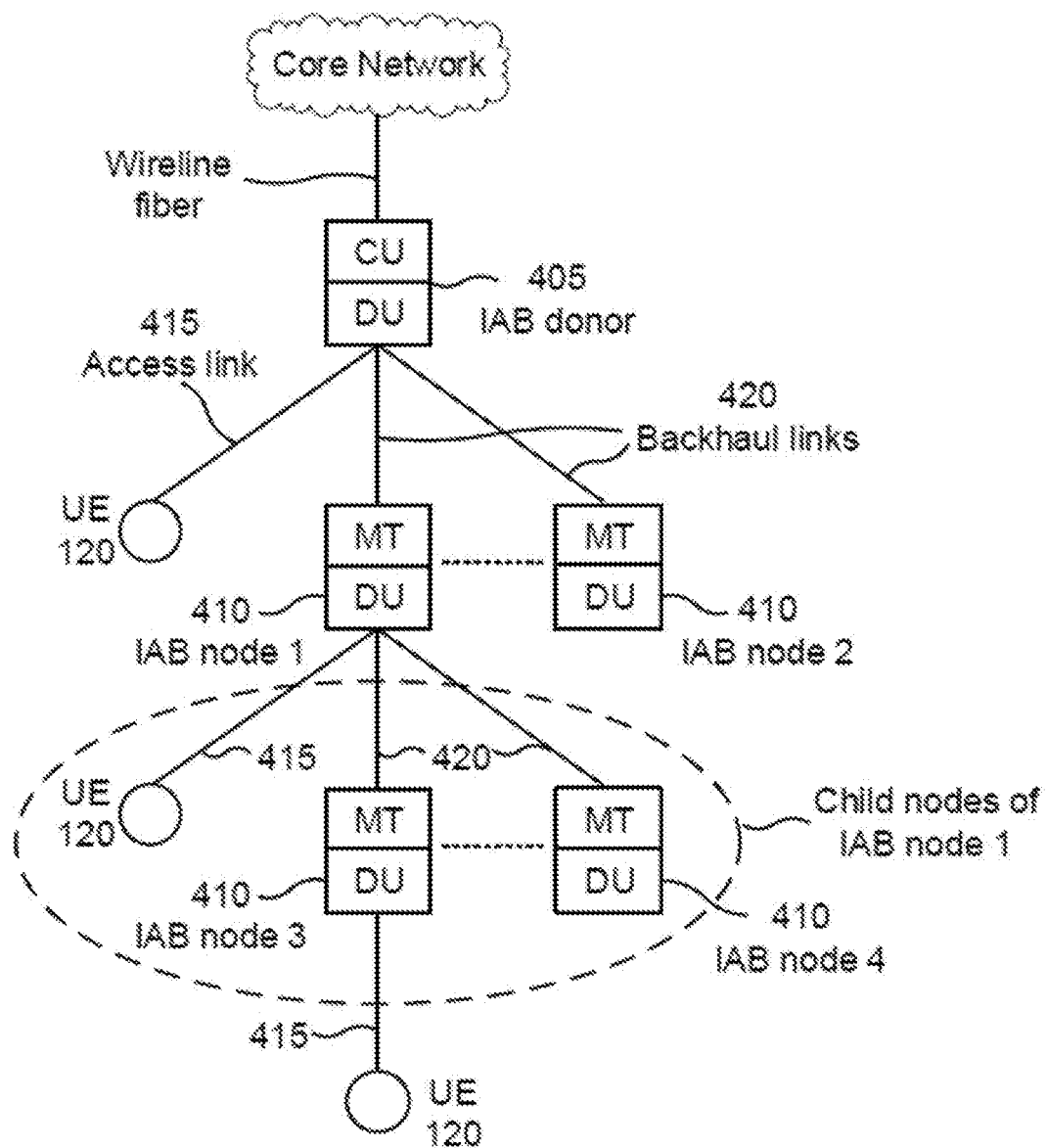
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

Example Uplink Resource Management Using Pre-Allocated Grant and Activation Indication As discussed, certain aspects herein provide for uplink resource management using pre-allocated grant and activation indication. In certain aspects, such uplink resource management is performed using an uplink resource grant release message, also referred to as a negative SR. For example, in certain aspects, a first wireless communication device (e.g., a UE such as UE 120 or an IAB-node such as IAB node 410) is configured to transmit the uplink resource grant release message to a second wireless communication device (e.g., a BS such as BS 110 or an IAB-node such as IAB node 410 or IAB donor 405). In certain aspects, the uplink resource grant release message corresponds to an uplink resource granted to the first wireless communication device for transmitting uplink data to the second wireless communication device on an uplink. For example, the uplink resource grant release message is transmitted in a time resource allocated for communication of an uplink resource grant release message that corresponds to the uplink resource. The time resource may be allocated as a certain time period (e.g., a packet preparation time) before occurrence of the uplink resource.

The uplink resource grant release message indicates to the second wireless communication device that the first wireless communication device is releasing grant of the uplink resource, meaning the first wireless communication device will not use the uplink resource. The uplink resource may have been granted to the first wireless communication device using a configured grant as discussed. For example, the first wireless communication device may release grant of the uplink resource because an uplink data buffer of the first wireless communication device is empty as discussed. In another example, the first wireless communication device may release grant of the uplink resource because an uplink packet is received by the first wireless communication device (e.g., in the uplink data buffer) for processing less than a threshold time prior to occurrence of the first uplink resource as discussed.

Further, in certain aspects, if the second wireless communication device does not receive or fails to receive an uplink resource grant release message in a time resource allocated for communication of an uplink resource grant release message that corresponds to an uplink resource, the second wireless communication device determines that the first wireless communication device is going to use the uplink resource and attempts to receive/receives uplink data from the first wireless communication device on the uplink resource.

Figure 5:
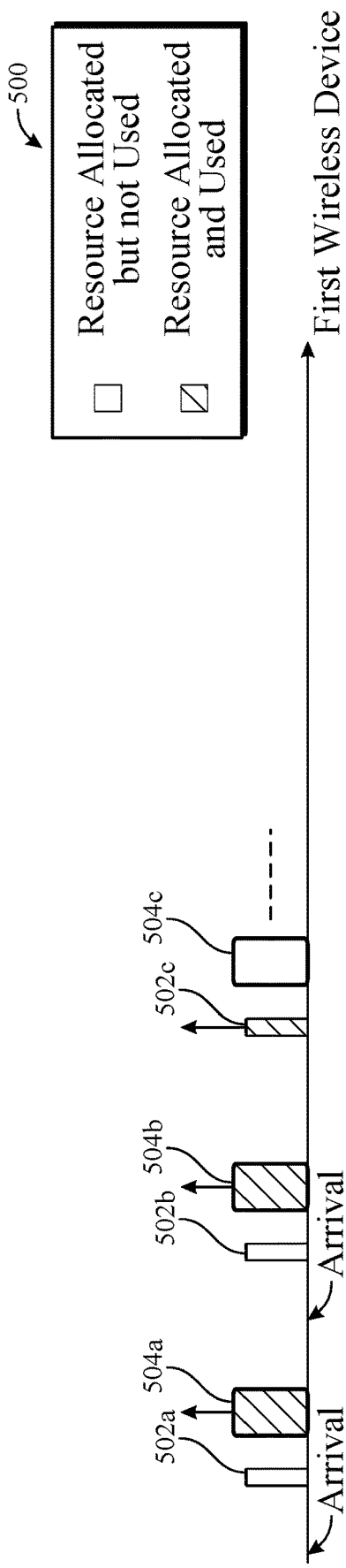
FIG. 5 illustrates an example timeline of communication of an uplink resource grant release message in accordance with various aspects of the disclosure.

FIG. 5 illustrates an example timeline 500 of communication of an uplink resource grant release message. As shown, timeline 500 indicates a plurality of resources 502a-502c allocated for communication of an uplink resource grant release message. Further, timeline 500 indicates a plurality of uplink resources 504a-504c granted to a first wireless communication device. As shown, resource 502a is allocated for communication of an uplink resource grant release message corresponding to uplink resource 504a. Further, resource 502b is allocated for communication of an uplink resource grant release message corresponding to uplink resource 504b, and resource 502c is allocated for communication of an uplink resource grant release message corresponding to uplink resource 504c. The "arrivals" indicate arrival of uplink data in an uplink buffer with sufficient time to transmit the uplink data on the subsequent uplink resource. As shown, the first wireless communication device does not transmit an uplink resource grant release message in either of resources 502a and 502b. Accordingly, the first wireless communication device transmits uplink data in uplink resources 504a and 504b. Further, as shown, the first wireless communication device transmits an uplink resource grant release message in resource 502c. Accordingly, the first wireless communication device refrains from transmitting uplink data in uplink resource 504c.

In certain aspects, the uplink resource grant release message is used in conjunction with SR to indicate usage of uplink resources. For example, when a first wireless communication device transmits an uplink resource grant release message to a second wireless communication device corresponding to a given uplink resource, the second wireless communication device determines that the first wireless communication device releases the given uplink resource and any subsequent granted uplink resources until the second wireless communication device receives a SR from the first wireless communication device. Further, when a first wireless communication device transmits a SR to a second wireless communication device corresponding to a given uplink resource, the second wireless communication device determines that the first wireless communication device has data to transmit and uses the given uplink resource and any subsequent granted uplink resources until the second wireless communication device receives an uplink resource grant release message from the first wireless communication device. Accordingly, the use of uplink resource grant release message in conjunction with SR to indicate usage of uplink resources allows the first wireless communication device to indicate release of multiple granted uplink resources or use of multiple granted uplink resources for entire time periods, thus advantageously reducing signaling required in certain cases. In certain aspects, the resources allocated for communicating uplink grant release message are separated in time, frequency, coding domain (e.g., using different cyclic shifts), or any combination thereof from the resources allocated for communicating SR.

Figure 6:
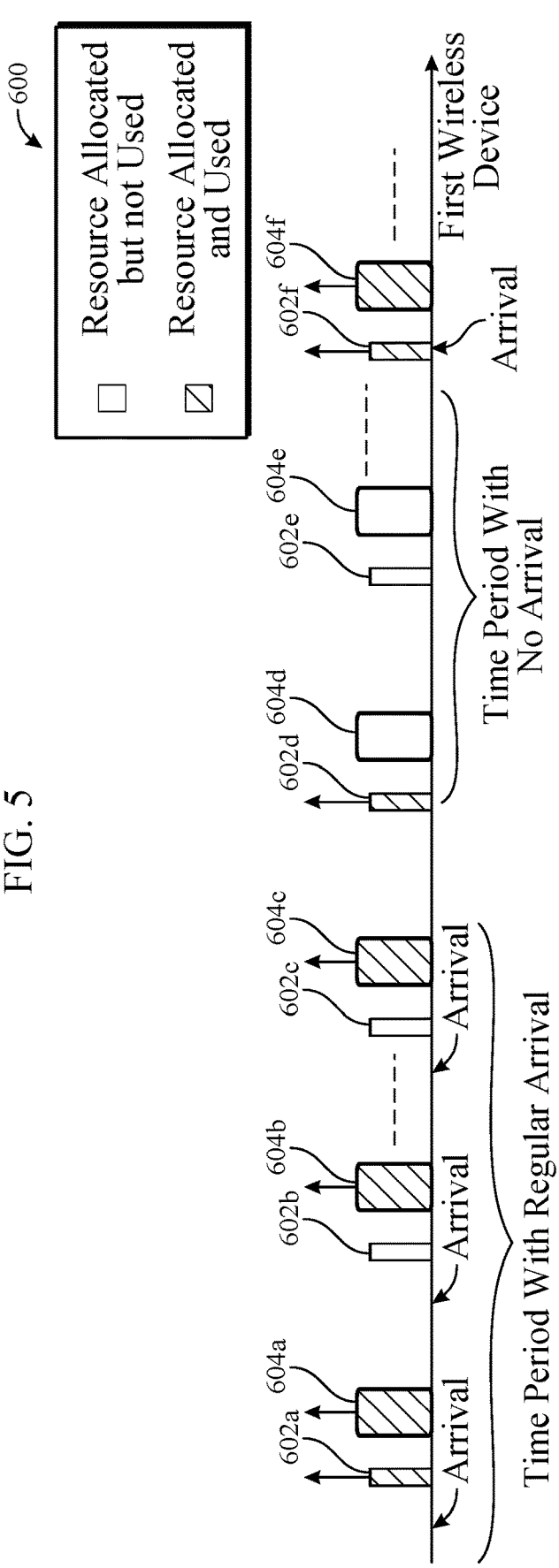
FIG. 6 illustrates an example timeline of communication of an uplink resource grant release message in conjunction with scheduling request (SR) in accordance with various aspects of the disclosure.

FIG. 6 illustrates an example timeline 600 of communication of an uplink resource grant release message in conjunction with SR. As shown, timeline 600 indicates a plurality of resources 602a-602f allocated for communication of an uplink resource grant release message and/or SR. In certain aspects, each resource 602 may actually correspond to two separate resources, one for communicating uplink resource grant release message, and the other for communicating SR as discussed. Further, timeline 600 indicates a plurality of uplink resources 604a-604f granted to a first wireless communication device. As shown, resource 602a is allocated for communication of an uplink resource grant release message/SR corresponding to uplink resource 604a. Further, resource 602b is allocated for communication of an uplink resource grant release message/SR corresponding to uplink resource 604b, resource 602c is allocated for communication of an uplink resource grant release message/SR corresponding to uplink resource 604c, and so on with resources 602d-602f corresponding to uplink resources 604d-604f, respectively. The "arrivals" indicate arrival of uplink data in an uplink buffer with sufficient time to transmit the uplink data on the subsequent uplink resource.

As shown, the first wireless communication device transmits a SR in resources 602a and 602f, and further transmits an uplink resource grant release message in resource 602d. The first wireless communication device refrains from transmitting any SR and any uplink resource grant release message in resources 602b, 602c, and 602e. Accordingly, uplink resources 604a-604c occur after transmission of a SR and prior to transmission of an uplink resource grant release message. Thus, the first wireless communication device transmits uplink data on uplink resources 604a-604c. Further, uplink resources 604d-604e occur after transmission of an uplink resource grant release message and prior to transmission of an SR. Thus, the first wireless communication device refrains from transmitting uplink data on uplink resources 604d-604e. Further, uplink resource 604f occur after transmission of a SR and prior to transmission of an uplink resource grant release message. Thus, the first wireless communication device transmits uplink data on uplink resource 604f.

In certain aspects, the second wireless communication device, upon receiving an uplink resource grant release message indicating that a granted given uplink resource of a first wireless communication device should be released, repurposes the given uplink resource. For example, the second wireless communication device itself may use the uplink resource to transmit uplink data to a third wireless communication device (e.g., a parent IAB-node). In another example, the second wireless communication device may grant the uplink resource to a third wireless communication device (e.g., a UE or a child IAB-node). Various specific examples are further discussed herein.

Figure 7A:
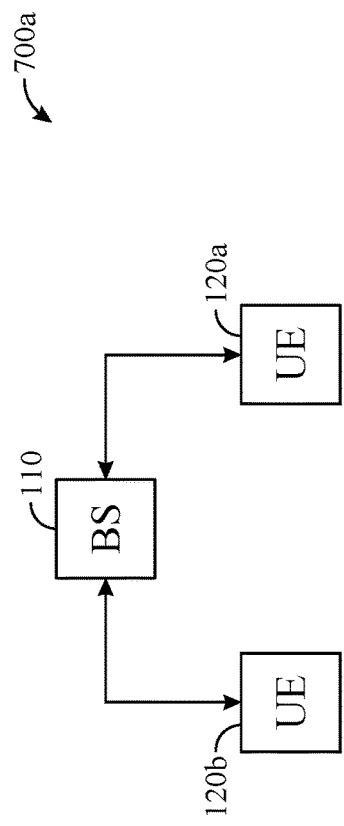
FIG. 7A illustrates a scenario where a BS is in communication with a first UE and a second UE in accordance with various aspects of the disclosure.
Figure 7B:
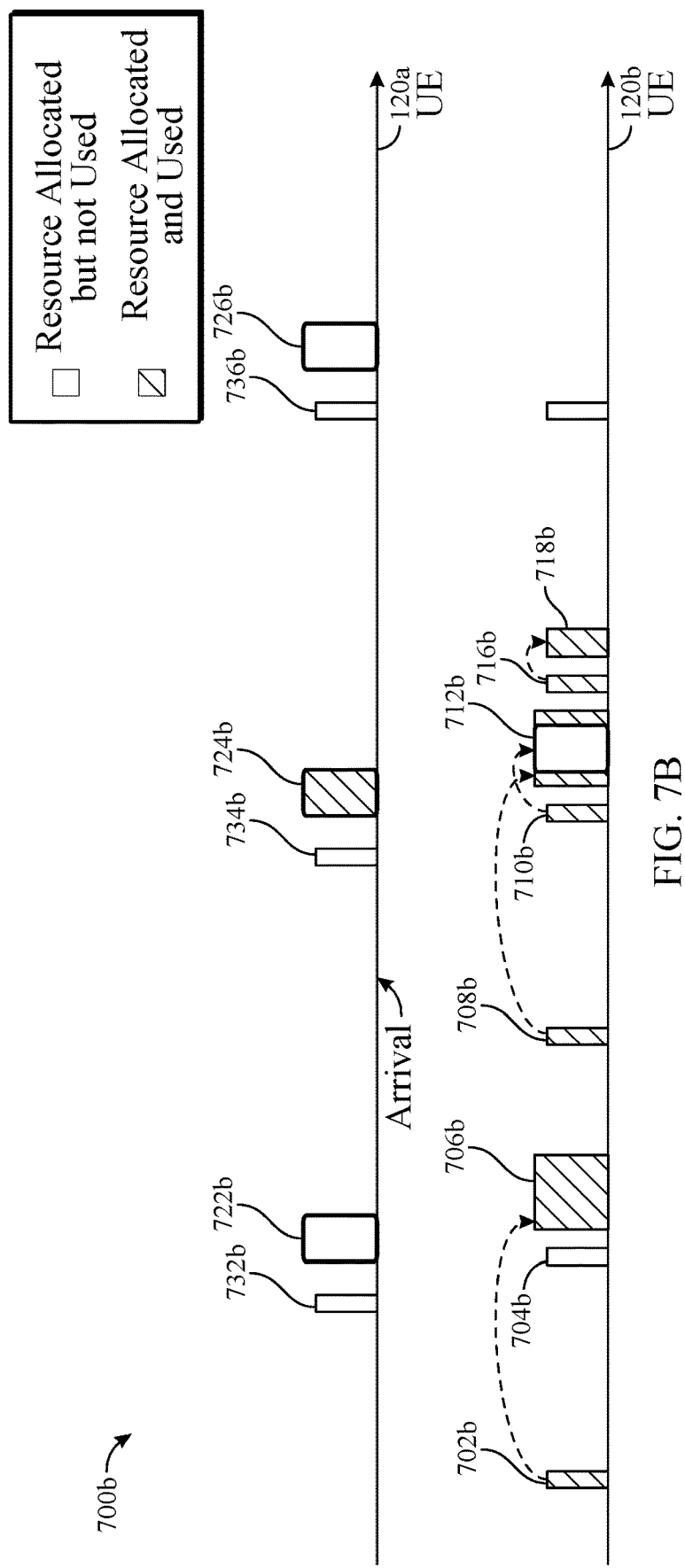
FIG. 7B illustrates an example timeline of communication by the first UE and the second UE of FIG. 7A in accordance with various aspects of the disclosure.
Figure 7C:
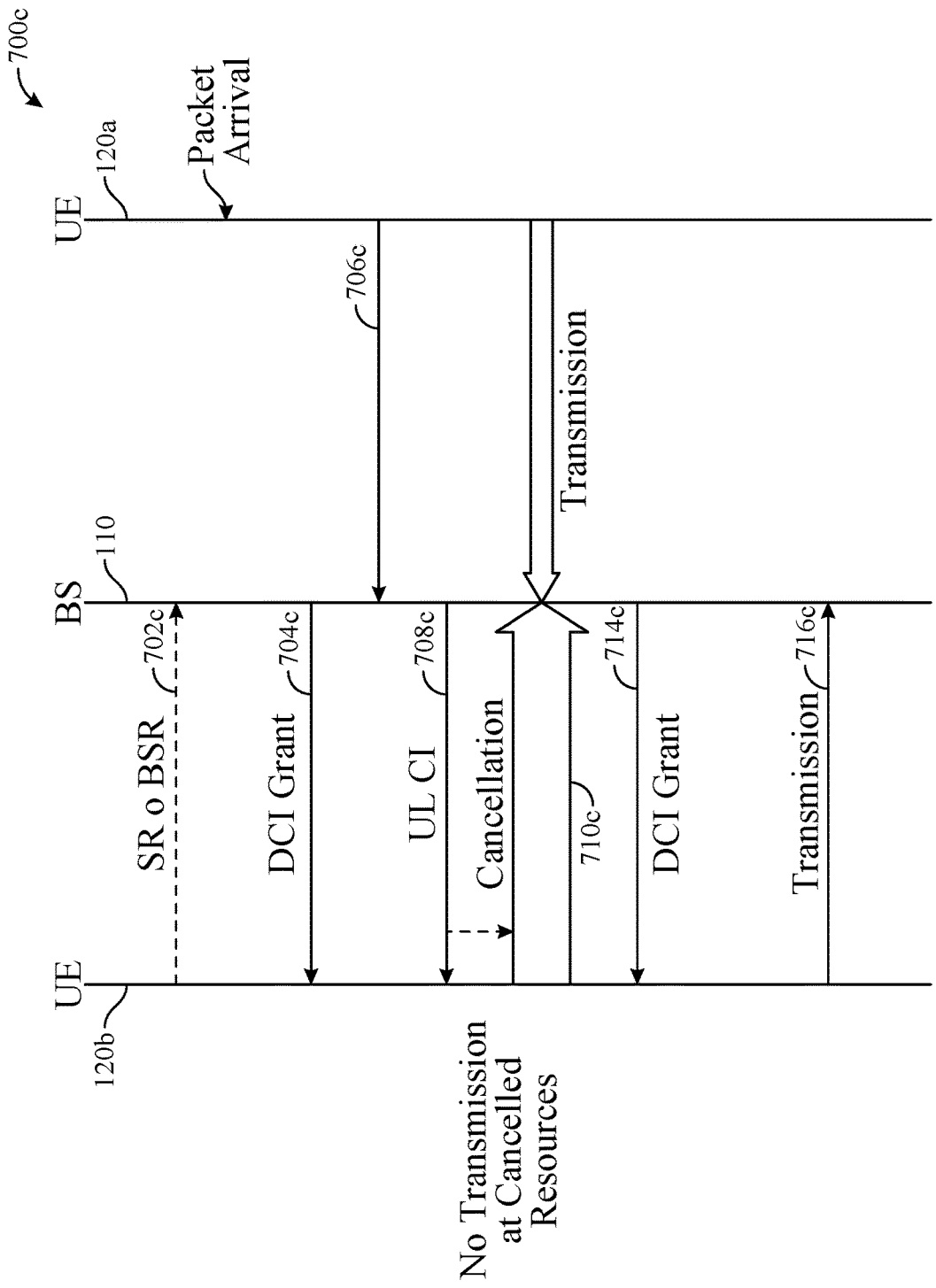
FIG. 7C illustrates a flow diagram illustrating an uplink cancellation indication (CI) procedure in accordance with various aspects of the disclosure.

One example is discussed with respect to FIGS. 7A-7C. FIG. 7A illustrates a scenario 700a where a BS 110 is in communication with a first UE 120a and a second UE 120b. Further, FIG. 7B illustrates an example timeline 700b of communication by the first UE 120a and the second UE 120b. It should be noted that though example is discussed with respect to a BS 110, UE 120a, and UE 120b, one or more of the BS 110, UE 120a, and UE 120b may be other types of wireless communication devices, such as an IAB node.

As shown, timeline 700b indicates a plurality of resources 732b, 734b, and 736b allocated to UE 120a for transmitting an uplink resource grant release message and/or SR to BS 110. In certain aspects, each resource 732b, 734b, and 736b may actually correspond to two separate resources, one for communicating uplink resource grant release message, and the other for communicating SR as discussed. Further, timeline 700b indicates a plurality of uplink resources 722b, 724b, and 726b granted to UE 120a to transmit to BS 110, such as using configured grant. As shown, resource 732b is allocated for communication of an uplink resource grant release message/SR corresponding to uplink resource 722b. Further, resource 734b is allocated for communication of an uplink resource grant release message/SR corresponding to uplink resource 724b, and resource 736b is allocated for communication of an uplink resource grant release message/SR corresponding to uplink resource 726b.

As shown, in resources 732b and 736b, UE 120a refrains from transmitting SR or transmits an uplink resource grant release message, depending on configuration of the UE 120a as using SR and/or uplink resource grant release message. Accordingly, UE 120a releases granted uplink resources 722b and 726b. Further, in resource 734b, UE 120a transmits SR or refrains from transmitting an uplink resource grant release message, depending on configuration of the UE 120a as using SR and/or uplink resource grant release message. Accordingly, UE 120a utilizes uplink resource 724b and transmits uplink data to BS 110 on uplink resource 724b.

In certain aspects, UE 120*b* may indicate to the BS 110 that it has uplink data to transmit to the BS 110, such as by transmitting an SR or a BSR requesting an uplink resource with which to transmit uplink data to the BS 110. In certain aspects, in response, the BS 110 grants an uplink resource using a dynamic DCI grant to the UE 120*b*, wherein the uplink resource granted to the UE 120*b* overlaps with an uplink resource already granted (e.g., by configured grant) to the UE 120*a*. For example, as shown, BS 110 transmits dynamic DCI grant 702*b* to UE 120*b*, granting uplink resource 706*b* to UE 120*b*. As shown, uplink resource 706*b* overlaps with uplink resource 722*b*. As discussed, UE 120*a* has released uplink resource 722*b*, and therefore UE 120*b* can safely use uplink resource 706*b* without interfering with UE 120*a* even though uplink resource 706*b* overlaps with uplink resource 722*b*.

In some cases, however, BS 110 may grant UE 120*b* an uplink resource that overlaps with an uplink resource granted to the UE 120*a*, and the UE 120*a* may not release the overlapping resource. Accordingly, BS 110 may transmit an uplink cancellation indication (CI) to the UE 120*b* releasing the overlapping uplink resource granted to the UE 120*b*. FIG. 7C illustrates a flow diagram 700*c* illustrating an uplink cancellation indication (CI) procedure.

At step 702*c*, the UE 120*b* transmits to the BS 110 an SR or a BSR requesting an uplink resource with which to transmit uplink data to the BS 110. At step 704*c*, the BS 110 transmits to the UE 120*b* a dynamic DCI grant 708*b* granting uplink resource 712*b* to the UE 120*b*. As shown, uplink resource 712*b* overlaps with uplink resource 724*b* granted to UE 120*a*. At step 706*c*, in resource 734*b*, UE 120*a* transmits SR or refrains from transmitting an uplink resource grant release message to BS 110, depending on configuration of the UE 120*a* as using SR and/or uplink resource grant release message. Accordingly, BS 110 determines that UE 120*a* intends to utilize uplink resource 724*b* to transmit uplink data to BS 110. As shown, the dynamic DCI grant 708 transmission occurs prior to the occurrence of resource 734*b*, and therefore BS 110 is not aware of whether UE 120*a* intends to utilize uplink resource 724*b* prior to transmission of the dynamic DCI grant 708.

Thus, at step 708*c*, BS 110 transmits an uplink CI to the UE 120*b* indicating that UE 120*b* should not transmit uplink data on uplink resource 712*b* or at least the portion of uplink resource 712*b* that overlaps with uplink resource 724*b*. As shown, resources for transmitting uplink CI corresponding to an uplink resource occur prior to occurrence of the uplink resource and after occurrence of the corresponding resource for indicating SR and/or uplink resource grant release message.

Based on receiving the uplink CI with respect to uplink resource 724*b*/712*b*, at step 710*c*, UE 120*b* does not transmit uplink data to the BS 110 on any portion of uplink resource 712*b* that overlaps with uplink resource 724*b*, and optionally transmits uplink data to the BS 110 on any portion of uplink resource 712*b* that does not overlap with uplink resource 724*b*. Further, at step 710*c*, UE 120*a* transmits uplink data to the BS 110 on uplink resource 724*b*.

In certain aspects, if the UE 120*b* still has uplink data to transmit to the BS 110, at step 714*c*, BS 110 transmits another dynamic DCI grant 716*b* (e.g., a DCI re-transmission grant) to the UE 120*b* granting uplink resource 718*b* to the UE 120*b*. At step 716*c*, UE 120*b* then transmits uplink data to the BS 110 in uplink resource 718*b*.

It should be noted that with respect to uplink resource 706*b* granted to UE 120*b*, for which UE 120*a* releases overlapping uplink resource 722*b*, resource 704*b* may still be allocated for BS 110 to transmit an uplink CI with respect to uplink resource 706*b* to UE 120*b*. However, based on UE 120*a* releasing resource 722*b*, the BS 110 does not transmit the uplink CI to the UE 120*b*.

Figure 8A:
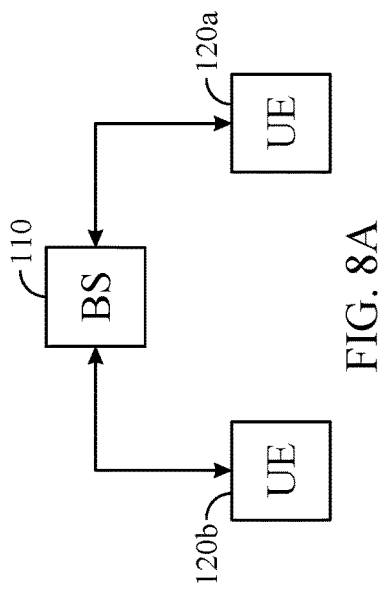
FIG. 8A illustrates a scenario where a BS is in communication with a first UE and a second UE in accordance with various aspects of the disclosure.
Figure 8B:
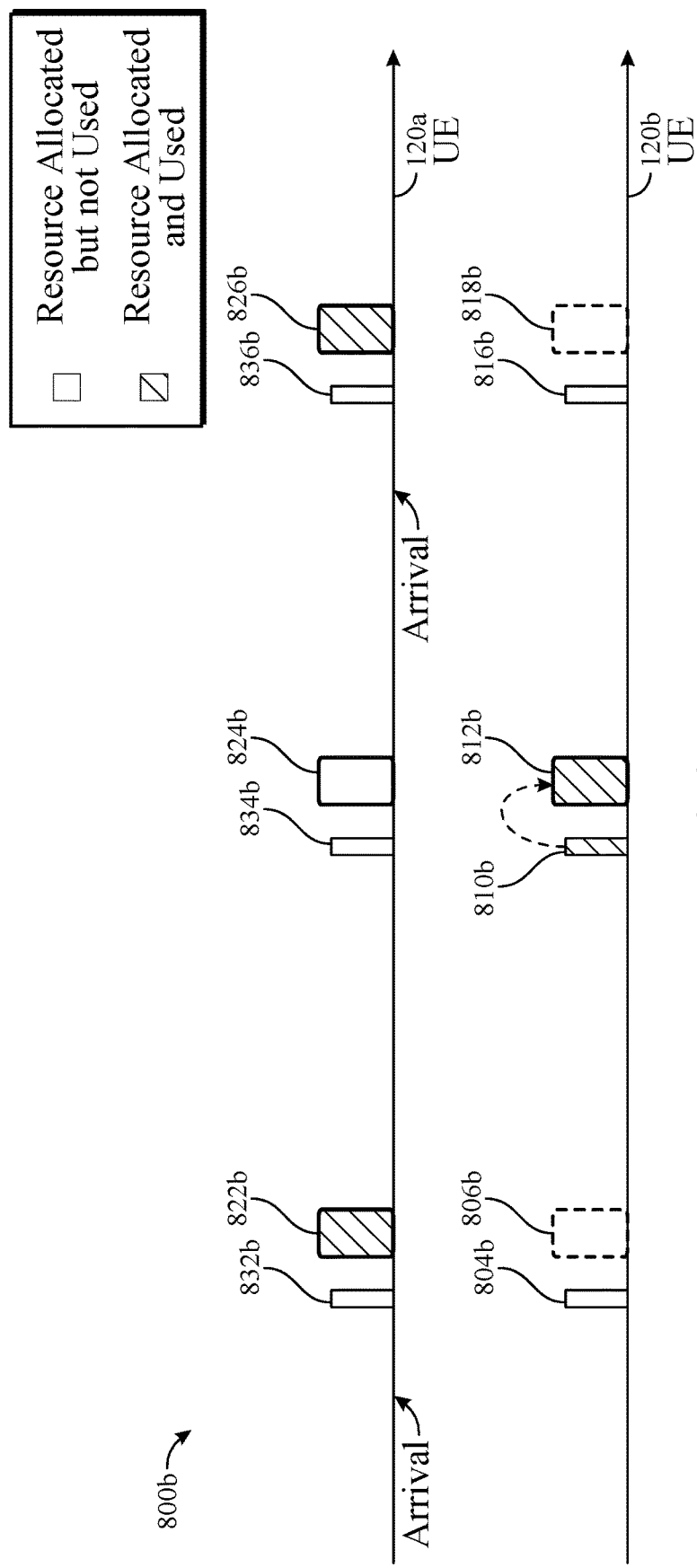
FIG. 8B illustrates an example timeline of communication by the first UE and the second UE of FIG. 8A in accordance with various aspects of the disclosure.

As discussed, certain aspects herein provide for uplink resource management using pre-allocated grant and activation indication. An example of such uplink resource management using pre-allocated grant and activation indication is discussed with respect to FIGS. 8A-8C. FIG. 8A illustrates a scenario 800*a* where a BS 110 is in communication with a first UE 120*a* and a second UE 120*b*. Further, FIG. 8B illustrates an example timeline 800*b* of communication by the first UE 120*a* and the second UE 120*b*. It should be noted that though example is discussed with respect to a BS 110, UE 120*a*, and UE 120*b*, one or more of the BS 110, UE 120*a*, and UE 120*b* may be other types of wireless communication devices, such as an IAB node.

As shown, timeline 800*b* indicates a plurality of resources 832*b*, 834*b*, and 836*b* allocated to UE 120*a* for transmitting an uplink resource grant release message and/or SR to BS 110. In certain aspects, each resource 832*b*, 834*b*, and 836*b* may actually correspond to two separate resources, one for communicating uplink resource grant release message, and the other for communicating SR as discussed. Further, timeline 800*b* indicates a plurality of uplink resources 822*b*, 824*b*, and 826*b* granted to UE 120*a* to transmit to BS 110, such as using configured grant. As shown, resource 832*b* is allocated for communication of an uplink resource grant release message/SR corresponding to uplink resource 822*b*. Further, resource 834*b* is allocated for communication of an uplink resource grant release message/SR corresponding to uplink resource 824*b*, and resource 836*b* is allocated for communication of an uplink resource grant release message/SR corresponding to uplink resource 826*b*.

As shown, in resource 834*b*, UE 120*a* refrains from transmitting SR or transmits an uplink resource grant release message, depending on configuration of the UE 120*a* as using SR and/or uplink resource grant release message. Accordingly, UE 120*a* releases granted uplink resource 824*b*. Further, in resources 832*b* and 836*b*, UE 120*a* transmits SR or refrains from transmitting an uplink resource grant release message, depending on configuration of the UE 120*a* as using SR and/or uplink resource grant release message. Accordingly, UE 120*a* utilizes uplink resources 822*b* and 826*b* and transmits uplink data to BS 110 on uplink resources 822*b* and 826*b*.

In certain aspects, BS 110 also allocates resources (e.g., periodic resources) to UE 120*b* using a message similar to a configured grant, the message being referred to herein to as a pre-allocated grant. In particular, the pre-allocated grant may include the same information as a configured grant (e.g., Type1 or Type2), but uplink resources are only allocated by the pre-allocated grant and not actually granted for use by the UE 120*b* until activated. In particular, each uplink resource allocated to the UE 120*b* is not activated or actually granted to the UE 120*b* unless the UE 120*b* receives an activation indication corresponding to the uplink resource from the BS 110. In certain aspects, the BS 110 transmits the activation indication to the UE 120*b* on a physical downlink control channel (PDCCH).

In certain aspects, when a UE 120*b* has uplink data to transmit (e.g., has one or more uplink data packets in an uplink data buffer) prior (e.g., a threshold time prior such as a packet preparation time) to an allocated uplink resource, the UE 120*b* prepares the uplink data for transmission in advance of receiving the activation indication. If the UE 120*b* then receives the activation indication corresponding to the uplink resource, the UE 120*b* can transmit the already prepared uplink data on the uplink resources. If the UE 120*b* fails to receive the activation indication corresponding to the uplink resource, the UE 120*b* refrains from transmitting in the uplink resource.

In certain aspects, resources are allocated for communication of activation indications corresponding to uplink resources allocated by pre-allocated grant and the UE 120*b* monitors the resources for activation indications. For example, as shown, timeline 800*b* indicates a plurality of resources 804*b*, 810*b*, and 816*b* allocated to UE 120*b* for receiving from BS 110 an activation indication. Further, timeline 800*b* indicates a plurality of uplink resources 806*b*, 812*b*, and 818*b* allocated to UE 120*b* to transmit uplink data to BS 110, such as using a pre-allocated grant. As shown, resource 804*b* is allocated for communication of an activation indication corresponding to uplink resource 806*b*. Further, resource 810*b* is allocated for communication of an activation indication corresponding to uplink resource 812*b*, and resource 816*b* is allocated for communication of an activation indication corresponding to uplink resource 818*b*.

Figure 8C:
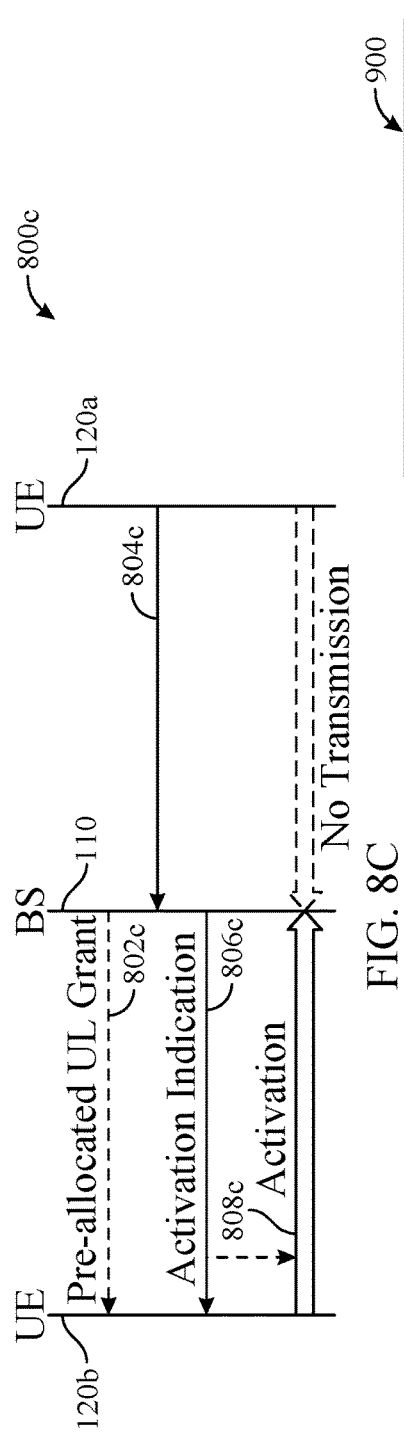
FIG. 8C illustrates a flow diagram illustrating a procedure using pre-allocated grant and activation indications in accordance with various aspects of the disclosure.

FIG. 8C illustrates a flow diagram 800*c* illustrating a procedure using pre-allocated grant and activation indications. In particular, flow diagram 800*c* is described with respect to a case where UE 120*b* is allocated using pre-allocated grant the same or at least partially overlapping periodic uplink resources as those granted to UE 120*a* using configured grant.

At step 802*c*, BS 110 transmits a pre-allocated grant to UE 120*b* allocating to UE 120*b* uplink resources. The uplink resources allocated may be the same or at least partially overlap with uplink resources granted to UE 120*a*. For example, as shown in timeline 800*b*, UE 120*b* is allocated uplink resources 806*b*, 812*b*, and 818*b*, which are the same as uplink resources 822*b*, 824*b*, and 826*b* granted to UE 120*a*.

At step 804*c*, in resource 834*b*, UE 120*a* refrains from transmitting SR or transmits an uplink resource grant release message to BS 110, depending on configuration of the UE 120*a* as using SR and/or uplink resource grant release message. Accordingly, BS 110 determines that UE 120*a* releases uplink resource 824*b*. In response to the release of uplink resource 824*b*, which is the same or overlaps with uplink resource 812*b* allocated to UE 120*b*, BS 110 transmits an activation indication to UE 120*b* in resource 810*b* corresponding to uplink resource 812*b*.

At step 808*c*, based on receiving the activation indication in resource 810*b* corresponding to uplink resource 812*b*, UE 120*b* transmits uplink data in uplink resource 812*b*, while UE 120*a* refrains from transmitting in uplink resource 824*b*.

The example described with respect to FIGS. 8A-8C may beneficially lead to less signaling than the example described with respect to FIGS. 7A-7C when the UE 120A more often utilizes granted uplink resources than it releases granted uplink resources.

Another example of use of an uplink resource grant release message in an IAB network is discussed with respect to FIG. 4. In certain aspects, UE 120 (or similarly a child IAB node (e.g., MT of the child IAB node) of IAB node 3) is granted periodic uplink resources using configured grant by IAB node 3 (e.g., the DU of IAB node 3). For a granted given uplink resource, if the UE 120 does not have uplink data to transmit on the given uplink resource, the UE 120 transmits an uplink resource grant release message corresponding to the given uplink resource to IAB node 3 (e.g., the DU of IAB node 3). Upon receiving the uplink resource grant release message corresponding to the given uplink resource, IAB node 3 may determine to utilize the given uplink resource to transmit uplink data. For example, IAB node 3 (e.g., the MT of IAB node 3) may have uplink data in its uplink data buffer (e.g., from other UEs or child IAB nodes), and may use the given uplink resource to transmit the uplink data to its parent IAB node, IAB node 1 (e.g., the DU of IAB node 1). In certain aspects, IAB node 3 (e.g., MT of IAB node 3) may prepare the uplink data in its uplink data buffer for transmission in advance of receiving the uplink resource grant release message, and once the IAB node 3 (e.g., DU of IAB node 3) receives the uplink resource grant release message, the IAB node 3 (e.g., MT of IAB node 3) transmits the uplink data. In certain aspects, IAB node 3 (e.g., MT of IAB node 3) is configured to transmit SR to IAB node 1 (e.g., DU of IAB node 1) prior to transmitting the uplink data to inform IAB node 1 of the transmission of the uplink data.

Figure 9:
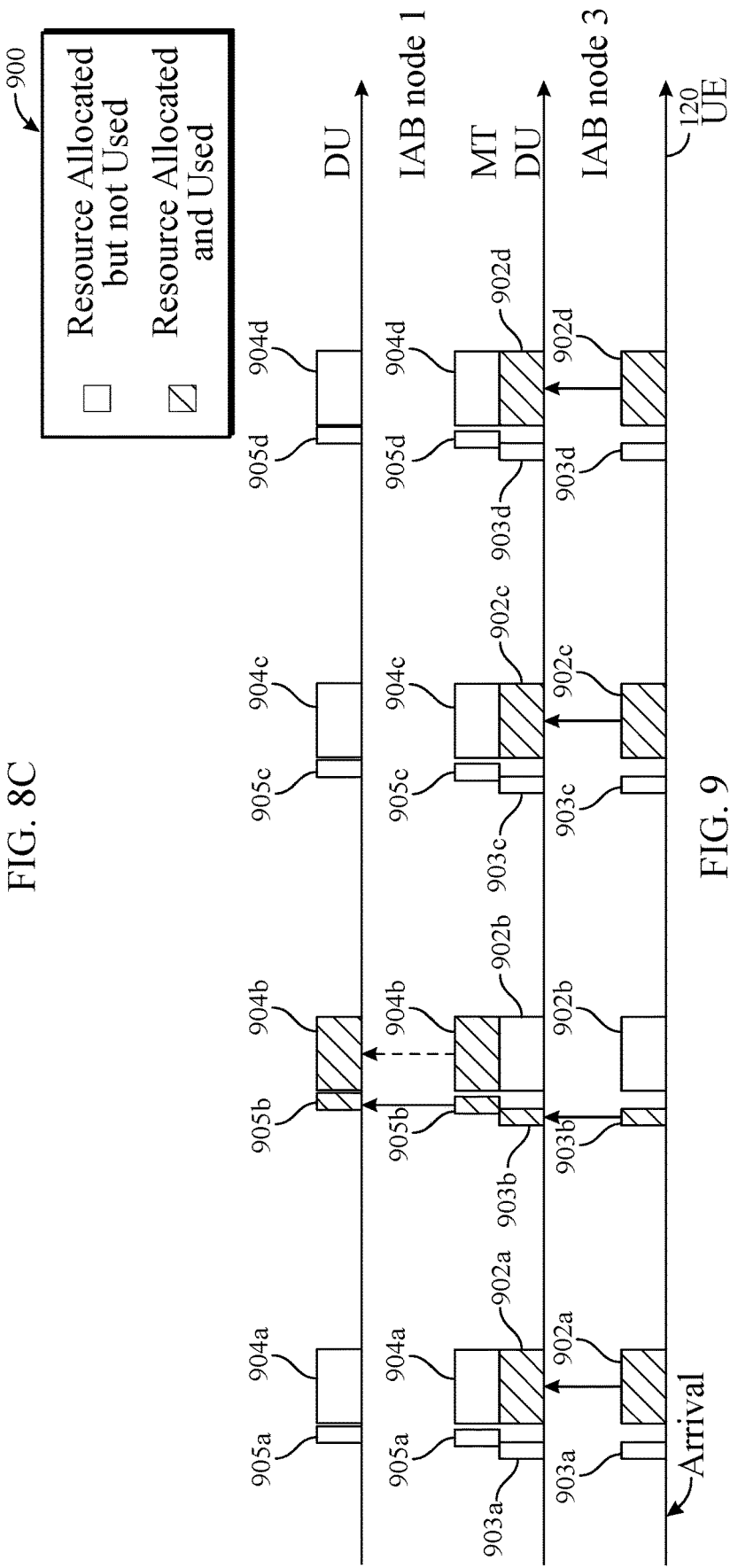
FIG. 9 illustrates an example timeline of communication by a UE, a first IAB node, and a second IAB node in accordance with various aspects of the disclosure.

FIG. 9 illustrates an example timeline 900 of communication by UE 120, IAB node 3 (DU and MT), and IAB node 1 (DU). As shown, UE 120 is granted (e.g., by configured grant from IAB node 3 DU) a plurality of uplink resources 902*a*-902*d* to transmit uplink data to IAB node 3 DU. Further, a plurality of resources 903*a*-903*d* are allocated for communication of uplink resource grant release messages from UE 120 to IAB node 3 DU corresponding to uplink resources 902*a*-902*d*.

In addition, IAB node 3 MT is granted (e.g., by configured grant from IAB node 1 DU) a plurality of uplink resources 904*a*-904*d* to transmit uplink data to IAB node 1 DU. Further, a plurality of resources 905*a*-905*d* are allocated for communication of SR from IAB node 3 MT to IAB node 1 DU corresponding to uplink resources 904*a*-904*d*. As shown, uplink resources 902*a*-902*d* are the same as or overlap with uplink resources 904*a*-904*d*.

As shown, UE 120 utilizes uplink resources 902*a*, 902*c*, and 902*d* to transmit uplink data to IAB node 3 DU, and therefore refrains from transmitting uplink resource grant release messages in corresponding resources 903*a*, 903*c*, and 903*d*. Further, UE 120 releases uplink resource 902*b*, and therefore transmits an uplink resource grant release message in corresponding resource 903*b*.

Based on IAB node 3 DU failing to receive uplink resource grant release messages in resources 903*a*, 903*c*, and 903*d*, IAB node 3 DU determines that UE 120 is utilizing uplink resources 902*a*, 902*c*, and 902*d* to transmit uplink data to IAB node 3 DU, and therefore IAB node 3 MT determines to refrain from transmitting on overlapping uplink resources 904*a*, 904*c*, and 904*d*. Accordingly, IAB node 3 MT refrains from transmitting SR to IAB node 1 DU in resources 905*a*, 905*c*, and 905*d* corresponding to uplink resources 904*a*, 904*c*, and 904*d*.

Based on IAB node 1 DU failing to receive SR in resources 905*a*, 905*c*, and 905*d*, IAB node 1 DU determines that IAB node 3 MT is not transmitting uplink data in corresponding uplink resources 904*a*, 904*c*, and 904*d*.

Further, based on IAB node 3 DU receiving an uplink resource grant release message in resource 903*b*, IAB node 3 DU determines that UE 120 is not utilizing uplink resource 902*b*, and therefore IAB node 3 MT determines it can use overlapping uplink resource 904*b* to transmit uplink data to IAB node 1 DU. Accordingly, IAB node 3 MT transmits SR to IAB node 1 DU in resource 905*b* corresponding to uplink resource 904*b*.

Based on IAB node 1 DU receiving SR in resource 905*b*, IAB node 1 DU determines that IAB node 3 MT is transmitting uplink data in corresponding uplink resource 904*b* and receives the uplink data.

Figure 10:
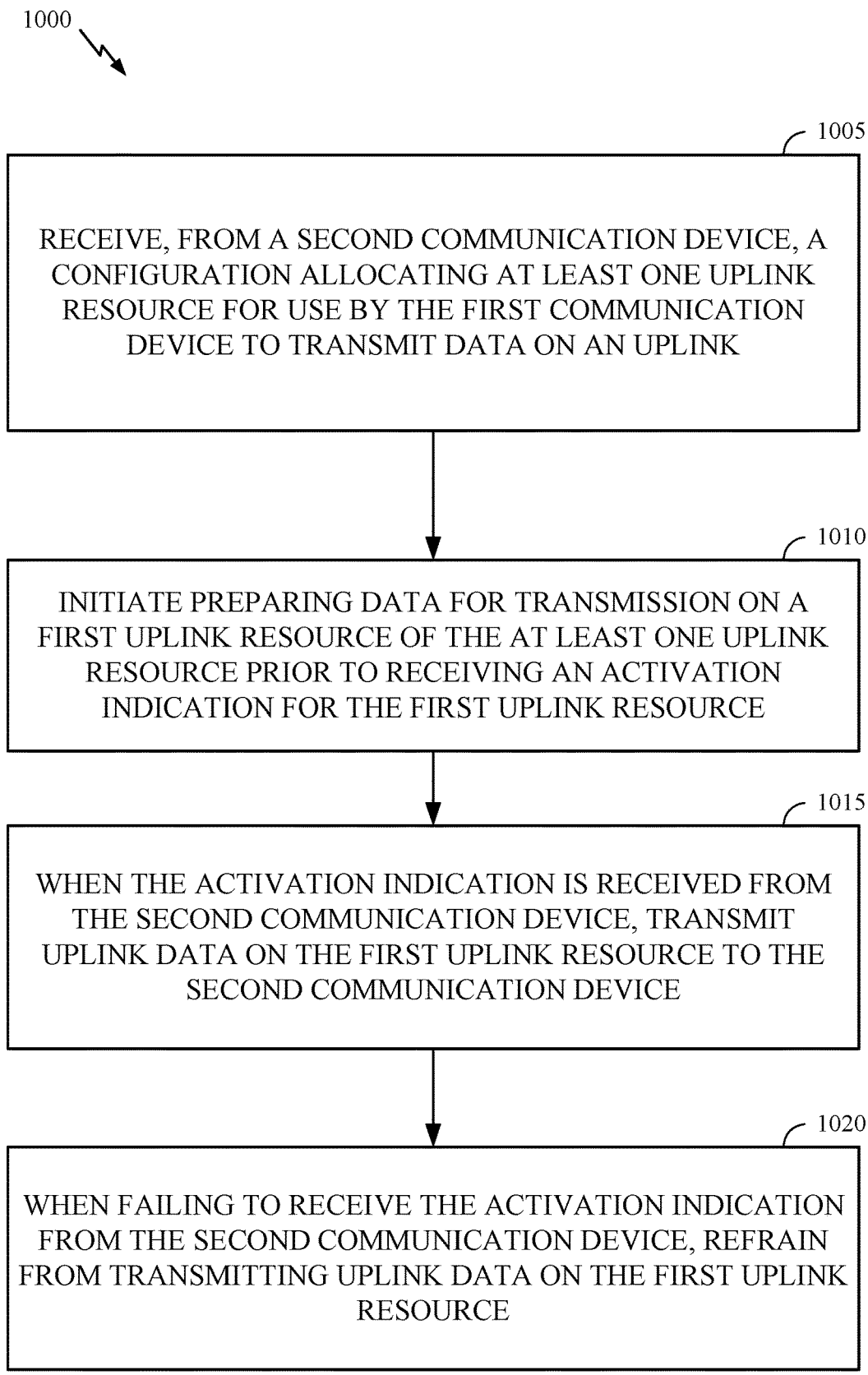
FIG. 10 is a flow diagram illustrating example operations for wireless communication by a first communication device, in accordance with certain aspects of the present disclosure.

FIG. 10 is a flow diagram illustrating example operations 1000 for wireless communication, in accordance with certain aspects of the present disclosure. The operations 1000 may be performed, for example, by a first communication device (e.g., such as a UE 120 or IAB node (e.g., MT)). Operations 1000 may be implemented as software components that are executed and run on one or more processors (e.g., controller/processor 280 of FIG. 2). Further, the transmission and reception of signals by the first communication device in operations 1000 may be enabled, for example, by one or more antennas (e.g., antennas 252 of FIG. 2). In certain aspects, the transmission and/or reception of signals by the first communication device may be implemented via a bus interface of one or more processors (e.g., controller/processor 280) obtaining and/or outputting signals.

The operations 1000 may begin, at 1005, by receiving, from a second communication device, a configuration (e.g., pre-allocated grant) allocating at least one uplink resource for use by the first communication device to transmit data on an uplink. Further, at 1010, the first communication device initiates preparing data for transmission on a first uplink resource of the at least one uplink resource prior to receiving an activation indication for the first uplink resource.

Continuing, at 1015, when the activation indication is received from the second communication device, the first communication device transmits uplink data on the first uplink resource to the second communication device. Further, at 1020, when failing to receive the activation indication from the second communication device, the first communication device refrains from transmitting uplink data on the first uplink resource.

In certain aspects of operations 1000, the activation indication is received based on the second communication device receiving an indication (e.g., uplink resource grant release message) that grant of the first uplink resource for use by a third communication device can be released.

In certain aspects of operations 1000, the activation indication is received based on the second communication device failing to receive an indication (e.g., SR) that a third communication device has data to transmit on the first uplink resource.

In certain aspects of operations 1000, the first communication device comprises a user equipment (UE) and the second communication device comprises a base station (BS)1.

In certain aspects of operations 1000, the second communication device comprises an integrated access and backhaul network (IAB) node. In certain such aspects, the first communication device comprises a user equipment (UE). In certain such aspects, the first communication device comprises another IAB node.

In certain aspects of operations 1000, the configuration is included in a radio resource control message.

In certain aspects of operations 1000, the configuration is included in a downlink control information.

In certain aspects of operations 1000, the activation indication is received on a physical downlink control channel.

Figure 11:
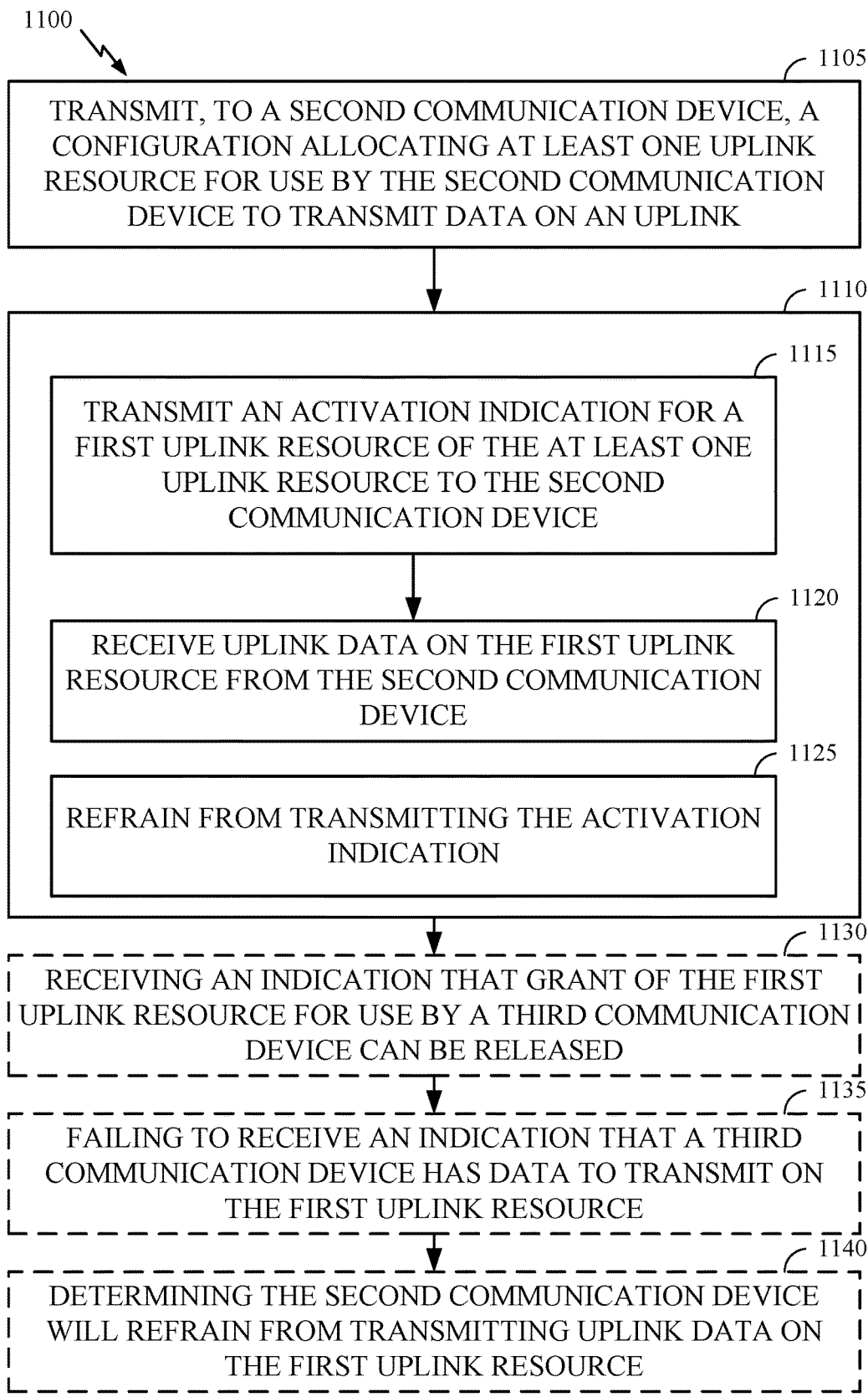
FIG. 11 is a flow diagram illustrating example operations for wireless communication by a first communication device, in accordance with certain aspects of the present disclosure.

FIG. 11 is a flow diagram illustrating example operations 1100 for wireless communication, in accordance with certain aspects of the present disclosure. The operations 1100 may be performed, for example, by a first communication device (e.g., such as a BS 110 or IAB node (e.g., DU)). Operations 1100 may be implemented as software components that are executed and run on one or more processors (e.g., controller/processor 240 of FIG. 2). Further, the transmission and reception of signals by the first communication device in operations 1100 may be enabled, for example, by one or more antennas (e.g., antennas 234 of FIG. 2). In certain aspects, the transmission and/or reception of signals by the first communication device may be implemented via a bus interface of one or more processors (e.g., controller/processor 240) obtaining and/or outputting signals.

The operations 1100 may begin, at 1105, by transmitting, to a second wireless communication device, a configuration (e.g., pre-allocated grant) allocating at least one uplink resource for use by the second communication device to transmit data on an uplink. Further, at 1110, the first communication device one of: at 1115, transmits an activation indication for a first uplink resource of the at least one uplink resource to the second communication device, and at 1120, receives uplink data on the first uplink resource from the second communication device; or at 1125, refrains from transmitting the activation indication.

In certain aspects of operations 1100, operations 1100 further include, optionally at 1130, receiving an indication that grant of the first uplink resource for use by a third communication device can be released, wherein the activation indication is transmitted based on the first communication device receiving the indication.

In certain aspects of operations 1100, operations 1100 further include, optionally at 1135, failing to receive an indication that a third communication device has data to transmit on the first uplink resource, wherein the activation indication is transmitted based on the first communication device failing to receive the indication.

In certain aspects of operations 1100, operations 1100 further include, optionally at 1140, determining the second communication device will refrain from transmitting uplink data on the first uplink resource, wherein the activation indication is refrained from being transmitted based on determining the second communication device will refrain from transmitting uplink data on the first uplink resource.

In certain aspects of operations 1100, the second communication device comprises a user equipment (UE) and the first communication device comprises a base station (BS).

In certain aspects of operations 1100, the first communication device comprises an integrated access and backhaul network (IAB) node. In certain such aspects, the second communication device comprises a user equipment (UE). In certain such aspects, the second communication device comprises another IAB node.

In certain aspects of operations 1100, the configuration is included in a radio resource control message.

In certain aspects of operations 1100, the configuration is included in a downlink control information.

In certain aspects of operations 1100, the activation indication is transmitted on a physical downlink control channel.

Figure 12:
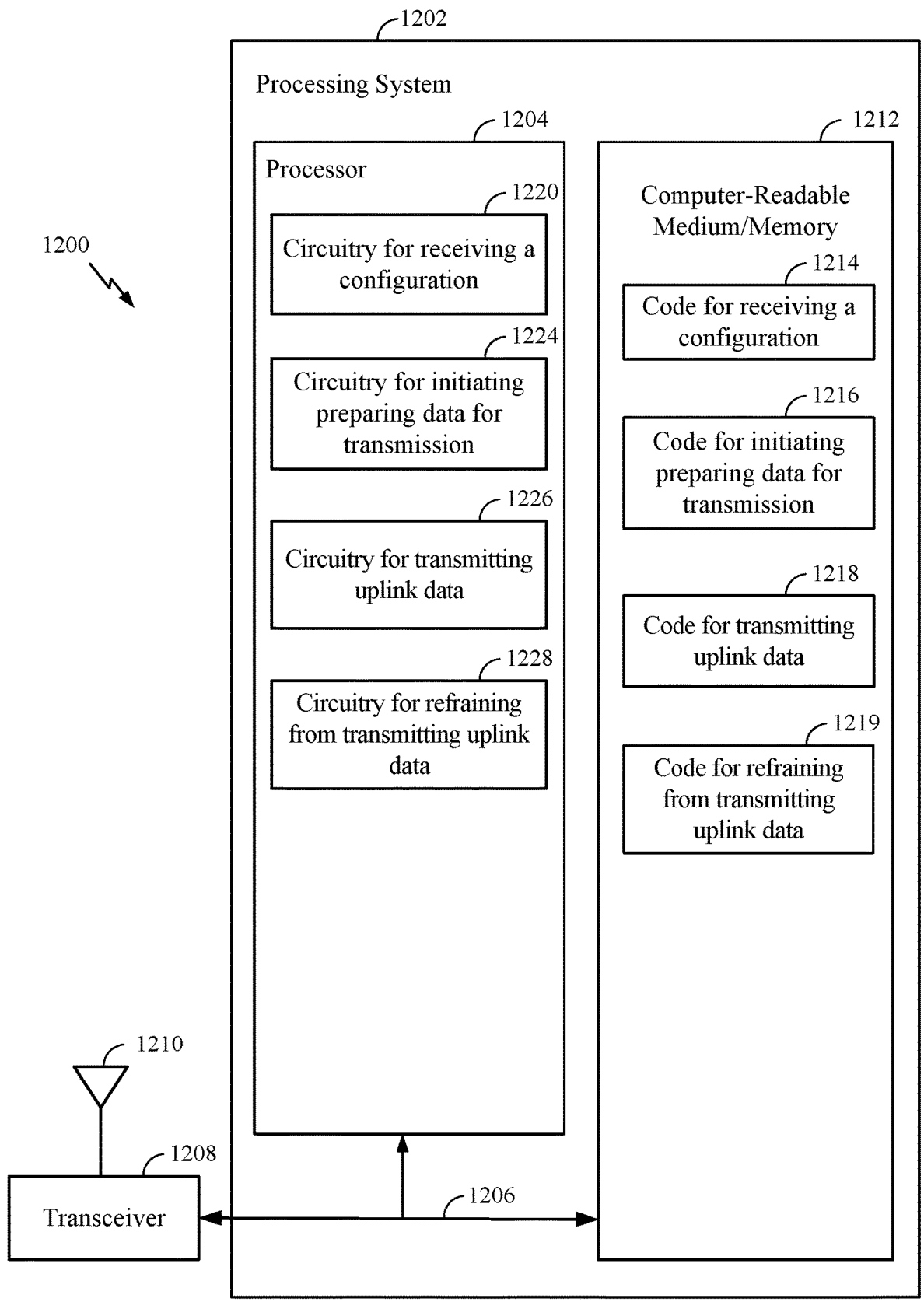
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for managing uplink resources. In certain aspects, computer-readable medium/memory 1212 stores code for receiving, from a second communication device, a configuration allocating at least one uplink resource for use by the first communication device to transmit data on an uplink 1214, code for initiating preparing data for transmission on a first uplink resource of the at least one uplink resource prior to receiving an activation indication for the first uplink resource 1216, code for when the activation indication is received from the second communication device, transmitting uplink data on the first uplink resource to the second communication device 1218, and code for when failing to receive the activation indication from the second communication device, refraining from transmitting uplink data on the first uplink resource 1219. In certain aspects, the processor 1204 has circuitry configured to implement the code stored in the computer-readable medium/memory 1212. The processor 1204 includes circuitry for (e.g., corresponding to means for) receiving, from a second communication device, a configuration allocating at least one uplink resource for use by the first communication device to transmit data on an uplink 1220, circuitry for (e.g., corresponding to means for) initiating preparing data for transmission on a first uplink resource of the at least one uplink resource prior to receiving an activation indication for the first uplink resource 1224, circuitry for (e.g., corresponding to means for) when the activation indication is received from the second communication device, transmitting uplink data on the first uplink resource to the second communication device 1226, and circuitry for (e.g., corresponding to means for) when failing to receive the activation indication from the second communication device, refraining from transmitting uplink data on the first uplink resource 1228. One or more of circuitry 1220 to 1228 may be implemented by one or more of a DSP, a circuit, an application specific integrated circuit (ASIC), or processor (e.g., a general purpose or specifically programmed processor).

Figure 13:
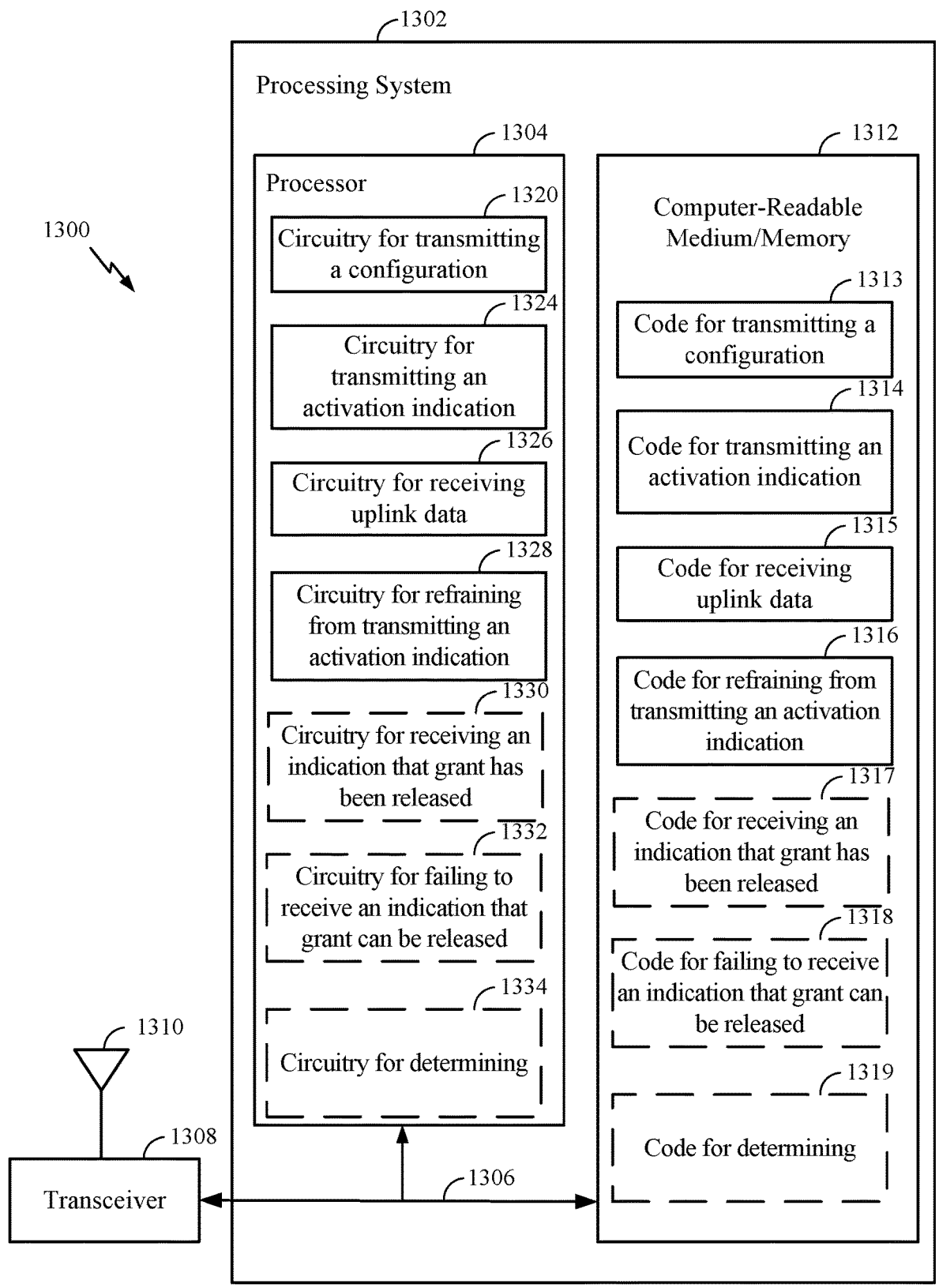
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for managing uplink resources. In certain aspects, computer-readable medium/memory 1312 stores code for transmitting, to a second communication device, a configuration allocating at least one uplink resource for use by the second communication device to transmit data on an uplink 1313, code for transmitting an activation indication for a first uplink resource of the at least one uplink resource to the second communication device 1314, code for receiving uplink data on the first uplink resource from the second communication device 1315, code for refraining from transmitting the activation indication 1316, optionally code for receiving an indication that grant of the first uplink resource for use by a third communication device can be released, wherein the activation indication is transmitted based on the first communication device receiving the indication 1317, optionally code for failing to receive an indication that a third communication device has data to transmit on the first uplink resource, wherein the activation indication is transmitted based on the first communication device failing to receive the indication 1318, and optionally code for determining the second communication device will refrain from transmitting uplink data on the first uplink resource, wherein the activation indication is refrained from being transmitted based on determining the second communication device will refrain from transmitting uplink data on the first uplink resource 1319.

In certain aspects, the processor 1304 has circuitry configured to implement the code stored in the computer-readable medium/memory 1312. The processor 1304 includes circuitry for (e.g., corresponding to means for) transmitting, to a second communication device, a configuration allocating at least one uplink resource for use by the second communication device to transmit data on an uplink 1320, circuitry for (e.g., corresponding to means for) transmitting an activation indication for a first uplink resource of the at least one uplink resource to the second communication device 1324, circuitry for (e.g., corresponding to means for) receiving uplink data on the first uplink resource from the second communication device 1326, circuitry for (e.g., corresponding to means for) refraining from transmitting the activation indication 1328, optionally circuitry for (e.g., corresponding to means for) receiving an indication that grant of the first uplink resource for use by a third communication device can be released, wherein the activation indication is transmitted based on the first communication device receiving the indication 1330, optionally circuitry for (e.g., corresponding to means for) failing to receive an indication that a third communication device has data to transmit on the first uplink resource, wherein the activation indication is transmitted based on the first communication device failing to receive the indication 1332, and optionally circuitry for (e.g., corresponding to means for) determining the second communication device will refrain from transmitting uplink data on the first uplink resource, wherein the activation indication is refrained from being transmitted based on determining the second communication device will refrain from transmitting uplink data on the first uplink resource 1334. One or more of circuitry 1320 to 1334 may be implemented by one or more of a DSP, a circuit, an application specific integrated circuit (ASIC), or processor (e.g., a general purpose or specifically programmed processor).

Figure 14:
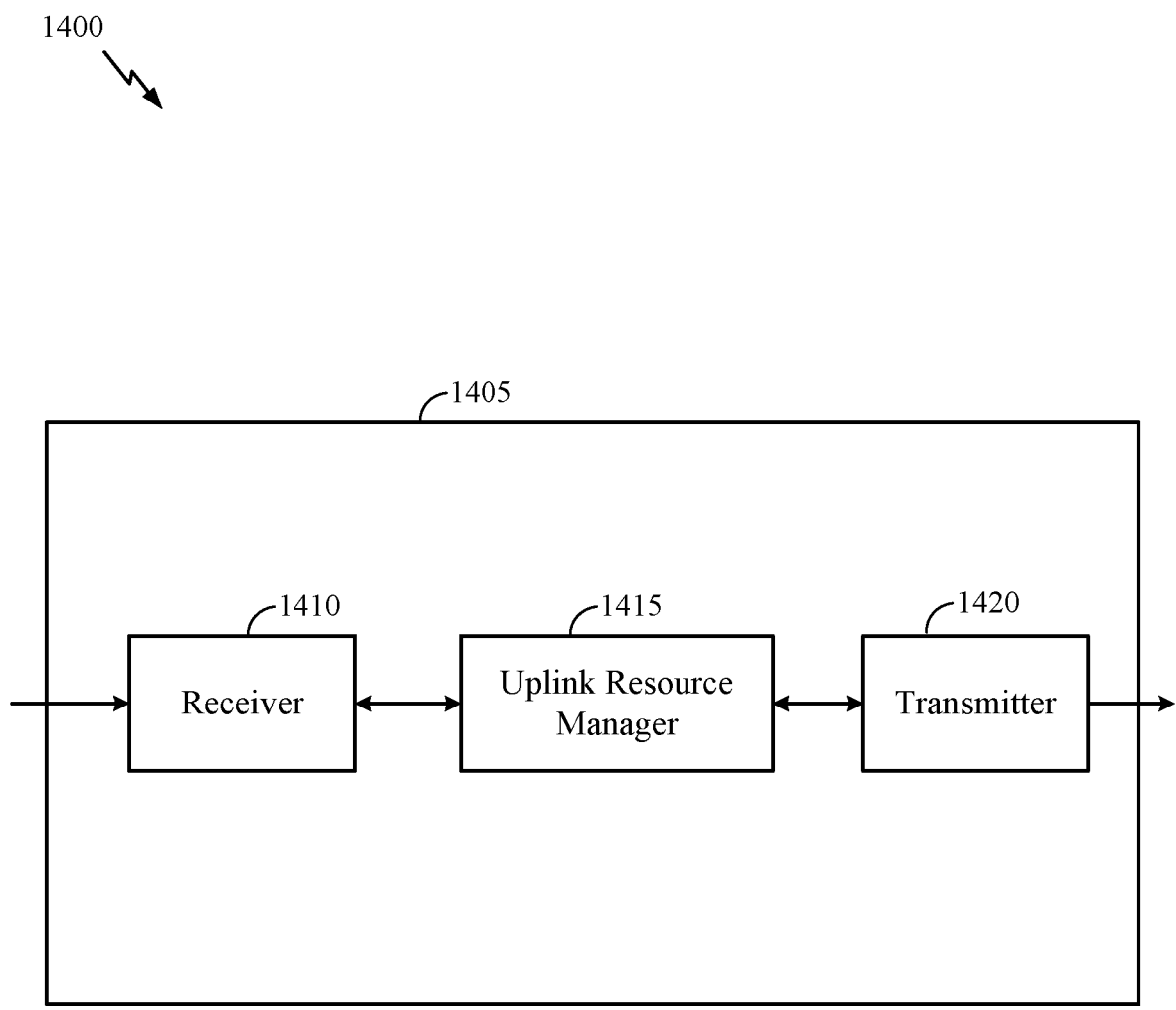
FIG. 14 shows a block diagram of a device that supports managing uplink resources in accordance with one or more aspects of the present disclosure.

FIG. 14 shows a block diagram 1400 of a device 1405 that supports managing uplink resources in accordance with one or more aspects of the present disclosure. The device 1405 may be an example of aspects of a UE 120 or a BS 110 as described herein. The device 1405 may include a receiver 1410, an uplink resource manager 1415 (e.g., uplink resource manager 112 or 122), and a transmitter 1420. The device 1405 may also include a processor. Each of these components may be in communication with one another (e.g., via one or more buses).

The receiver 1410 may provide a means for receiving information such as packets, user data, or control information associated with various information channels (e.g., control channels, data channels, and information related to power saving of smart repeaters based on a triggering signal, etc.). Information may be passed on to other components of the device 1405. The receiver 1410 may be an example of aspects of the transceiver 232 or 254 described with reference to FIG. 2. The receiver 1410 may utilize a single antenna or a set of antennas.

The uplink resource manager 1415 may support wireless communication in accordance with examples as disclosed herein.

In certain aspects, the uplink resource manager 1415 may provide means for receiving, from a second communication device, a configuration allocating at least one uplink resource for use by the first communication device to transmit data on an uplink; means for initiating preparing data for transmission on a first uplink resource of the at least one uplink resource prior to receiving an activation indication for the first uplink resource; means for when the activation indication is received from the second communication device, transmitting uplink data on the first uplink resource to the second communication device; and/or means for when failing to receive the activation indication from the second communication device, refraining from transmitting uplink data on the first uplink resource.

In certain aspects, the uplink resource manager 1415 may provide means for transmitting, to a second communication device, a configuration allocating at least one uplink resource for use by the second communication device to transmit data on an uplink; means for transmitting an activation indication for a first uplink resource of the at least one uplink resource to the second communication device, and receiving uplink data on the first uplink resource from the second communication device; means for refraining from transmitting the activation indication; means for receiving an indication that grant of the first uplink resource for use by a third communication device can be released, wherein the activation indication is transmitted based on the first communication device receiving the indication; means for failing to receive an indication that a third communication device has data to transmit on the first uplink resource, wherein the activation indication is transmitted based on the first communication device failing to receive the indication; and/or means for determining the second communication device will refrain from transmitting uplink data on the first uplink resource, wherein the activation indication is refrained from being transmitted based on determining the second communication device will refrain from transmitting uplink data on the first uplink resource.

The uplink resource manager 1415 may be an example of means for performing various aspects of managing uplink resources as described herein. The uplink resource manager 1415, or its sub-components, may be implemented in hardware (e.g., in uplink resource management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the uplink resource manager 1415, or its sub-components, may be implemented in code (e.g., as uplink resource management software or firmware) executed by a processor, or any combination thereof. If implemented in code executed by a processor, the functions of the uplink resource manager 1415, or its sub-components may be executed by a general-purpose processor, a digital signal processor (DSP), an application-specific integrated circuit (ASIC), a field programmable gate array (FPGA) or other programmable logic device.

In some examples, the uplink resource manager 1415 may be configured to perform various operations (e.g., receiving, determining, transmitting) using or otherwise in cooperation with the receiver 1410, the transmitter 1420, or both.

The uplink resource manager 1415, or its sub-components, may be physically located at various positions, including being distributed such that portions of functions are implemented at different physical locations by one or more physical components. In some examples, the uplink resource manager 1415, or its sub-components, may be a separate and distinct component in accordance with various aspects of the present disclosure. In some examples, the uplink resource manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may provide means for transmitting signals generated by other components of the device 1405. In some examples, the transmitter 1420 may be collocated with a receiver 1410 in a transceiver module. For example, the transmitter 1420 may be an example of the transceiver 232 or 254 described with reference to FIG. 2. The transmitter 1420 may utilize a single antenna or a set of antennas.

Example Aspects

Aspect 1: A method of wireless communication by a first communication device, comprising: receiving, from a second communication device, a configuration allocating at least one uplink resource for use by the first communication device to transmit data on an uplink; initiating preparing data for transmission on a first uplink resource of the at least one uplink resource prior to receiving an activation indication for the first uplink resource; when the activation indication is received from the second communication device, transmitting uplink data on the first uplink resource to the second communication device; and when failing to receive the activation indication from the second communication device, refraining from transmitting uplink data on the first uplink resource.

Aspect 2: The method of Aspect 1, wherein the activation indication is received based on the second communication device receiving an indication that grant of the first uplink resource for use by a third communication device can be released.

Aspect 3: The method of Aspect 1, wherein the activation indication is received based on the second communication device failing to receive an indication that a third communication device has data to transmit on the first uplink resource.

Aspect 4: The method of any of Aspects 1-3, wherein the first communication device comprises a user equipment (UE) and the second communication device comprises a base station (BS).

Aspect 5: The method of any of Aspects 1-3, wherein the second communication device comprises an integrated access and backhaul network (IAB) node.

Aspect 6: The method of Aspect 5, wherein the first communication device comprises a user equipment (UE).

Aspect 7: The method of Aspect 5, wherein the first communication device comprises another TAB node.

Aspect 8: The method of any of Aspects 1-7, wherein the configuration is included in a radio resource control message.

Aspect 9: The method of any of Aspects 1-7, wherein the configuration is included in a downlink control information.

Aspect 10: The method of any of Aspects 1-9, wherein the activation indication is received on a physical downlink control channel.

Aspect 11: A method of wireless communication by a first communication device, comprising: transmitting, to a second communication device, a configuration allocating at least one uplink resource for use by the second communication device to transmit data on an uplink; and one of: transmitting an activation indication for a first uplink resource of the at least one uplink resource to the second communication device, and receiving uplink data on the first uplink resource from the second communication device; or refraining from transmitting the activation indication.

Aspect 12: The method of Aspect 11, further comprising receiving an indication that grant of the first uplink resource for use by a third communication device can be released, wherein the activation indication is transmitted based on the first communication device receiving the indication.

Aspect 13: The method of Aspect 11, further comprising failing to receive an indication that a third communication device has data to transmit on the first uplink resource, wherein the activation indication is transmitted based on the first communication device failing to receive the indication.

Aspect 14: The method of Aspect 11, further comprising determining the second communication device will refrain from transmitting uplink data on the first uplink resource, wherein the activation indication is refrained from being transmitted based on determining the second communication device will refrain from transmitting uplink data on the first uplink resource.

Aspect 15: The method of any of Aspects 11-14, wherein the second communication device comprises a user equipment (UE) and the first communication device comprises a base station (BS).

Aspect 16: The method of any of Aspects 11-14, wherein the first communication device comprises an integrated access and backhaul network (IAB) node Aspect 17: The method of Aspect 16, wherein the second communication device comprises a user equipment (UE).

Aspect 18: The method of Aspect 16, wherein the second communication device comprises another IAB node.

Aspect 19: The method of any of Aspects 11-18, wherein the configuration is included in a radio resource control message.

Aspect 20: The method of any of Aspects 11-18, wherein the configuration is included in a downlink control information.

Aspect 21: The method of any of Aspects 11-20, wherein the activation indication is transmitted on a physical downlink control channel.

Aspect 22: A first communication device comprising at least one means for performing a method of any one of Aspects 1-21.

Aspect 23: A first communication device comprising a processor and memory coupled to the processor, the processor and memory configured to perform a method of any one of Aspects 1-21.

Aspect 24: A non-transitory computer-readable storage medium having instructions stored thereon, that when executed by a first communication device, cause the first communication device to perform a method of any one of Aspects 1-21.

Additional Considerations

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a first communication device, the method comprising:
   receiving, from a second communication device, a configuration allocating one or more uplink resources for use by the first communication device to transmit uplink data to the second communication device on an uplink;
   preparing the uplink data for transmission on a first uplink resource of the one or more uplink resources prior to receiving an activation indication for the first uplink resource from the second communication device;
   when the activation indication is received from the second communication device, transmitting the prepared uplink data on the first uplink resource to the second communication device; and
   when the activation indication is not received from the second communication device,
   refraining from transmitting the prepared uplink data on the first uplink resource to the second communication device.

2. The method of claim 1, wherein the first communication device comprises a user equipment (UE) and the second communication device comprises a network entity.

3. The method of claim 1, wherein the second communication device comprises an integrated access and backhaul network (IAB) node.

4. The method of claim 3, wherein the first communication device comprises a user equipment (UE).

5. The method of claim 3, wherein the first communication device comprises another IAB node.

6. The method of claim 1, wherein the configuration is included in a radio resource control message.

7. The method of claim 1, wherein the configuration is included in a downlink control information.

8. A method of wireless communication by a second communication device, the method comprising:
   transmitting, to a first communication device, a configuration allocating one or more uplink resources for use by the first communication device to transmit uplink data to the first communication device on an uplink;
   receiving, from a third communication device, an indication releasing a grant of a first uplink resource of the one or more uplink resources;
   transmitting, to the first communication device, an activation indication for the first uplink resource of the one or more uplink resources based on the indication releasing the grant of the first uplink resource; and
   receiving the uplink data on the first uplink resource from the first communication device based on the activation indication.

9. The method of claim 8, wherein the first communication device comprises a user equipment (UE) and the second communication device comprises a network entity.

10. The method of claim 8, wherein the second communication device comprises an integrated access and backhaul network (IAB) node.

11. The method of claim 10, wherein the first communication device comprises a user equipment (UE).

12. The method of claim 10, wherein the first communication device comprises another IAB node.

13. The method of claim 8, wherein the configuration is included in a radio resource control message.

14. The method of claim 8, wherein the configuration is included in a downlink control information.

15. The method of claim 8, wherein the activation indication is transmitted on a physical downlink control channel.

16. A first communication device comprising:
   a memory comprising executable instructions; and
   one or more processors configured to execute the executable instructions and cause the first communication device to:
      receive, from a second communication device, a configuration allocating one or more uplink resources for use by the first communication device to transmit uplink data to the second communication device on an uplink;
      prepare the uplink data for transmission on a first uplink resource of the one or more uplink resources prior to reception of an activation indication for the first uplink resource from the second communication device;

when the activation indication is received from the second communication device, transmit the prepared uplink data on the first uplink resource to the second communication device; and when the activation indication is not received from the second communication device, refrain from transmitting the prepared uplink data on the first uplink resource.

17. The first communication device of claim 16, wherein the one or more processors are configured to cause the first communication device to receive the activation indication based on reception, by the second communication device, of an indication that a grant of the first uplink resource for use by a third communication device can be released.

18. The first communication device of claim 16, wherein the one or more processors are configured to cause the first communication device receive the activation indication is received based on failure, by the second communication device, to receive an indication that a third communication device has data to transmit on the first uplink resource.

19. The first communication device of claim 16, further comprising an antenna, wherein the one or more processors are configured to cause the first communication device to receive the configuration via the antenna.

20. The first communication device of claim 16, wherein the first communication device comprises a user equipment (UE) and the second communication device comprises a network entity.

21. A second communication device comprising:
a memory comprising executable instructions; and
one or more processors configured to execute the executable instructions and cause the second communication device to:
transmit, to a first communication device, a configuration allocating one or more uplink resources for use by the first communication device to transmit uplink data to the second communication device on an uplink;
receive, from a third communication device, an indication releasing a grant of a first uplink resource of the one or more uplink resources;
transmit, to the first communication device, an activation indication for the first uplink resource of the one or more uplink resources based on the indication releasing the grant of the first uplink resource; and
receive the uplink data on the first uplink resource from the first communication device based on the activation indication.

22. The first communication device of claim 21, further comprising an antenna, wherein the one or more processors are configured to cause the second communication device to transmit the configuration via the antenna.

23. A non-transitory computer-readable medium storing computer-executable instructions that, when executed by one or more processors of a first communication device, cause the first communication device to:
receive, from a second communication device, a configuration allocating one or more uplink resources for use by the first communication device to transmit uplink data to the second communication device on an uplink;
prepare the uplink data for transmission on a first uplink resource of the one or more uplink resources prior to receiving an activation indication for the first uplink resource from the second communication device;
when the activation indication is received from the second communication device, transmit the prepared uplink data on the first uplink resource to the second communication device; and
when activation indication is not received from the second communication device, refrain from transmitting the prepared uplink data on the first uplink resource to the second communication device.

24. A non-transitory computer-readable medium storing computer-executable instructions that, when executed by one or more processors of a second communication device, cause the second communication device to:
transmit, to a first communication device, a configuration allocating one or more uplink resources for use by the first communication device to transmit uplink data to the second communication device on an uplink;
receive, from a third communication device, an indication releasing a grant of a first uplink resource of the one or more uplink resources;
transmit, to the first communication device, an activation indication for the first uplink resource of the one or more uplink resources based on the indication releasing the grant of the first uplink resource; and
receive the uplink data on the first uplink resource from the first communication device based on the activation indication.

* * * * *